(12) United States Patent
Zhang et al.

(10) Patent No.: US 12,302,150 B2
(45) Date of Patent: May 13, 2025

(54) REQUEST-BASED INTERFERENCE MANAGEMENT

(71) Applicant: QUALCOMM Incorporated, San Diego, CA (US)

(72) Inventors: Qian Zhang, Basking Ridge, NJ (US); Junyi Li, Fairless Hills, PA (US); Navid Abedini, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 572 days.

(21) Appl. No.: 17/650,927

(22) Filed: Feb. 14, 2022

(65) Prior Publication Data

US 2023/0262499 A1   Aug. 17, 2023

(51) Int. Cl.
| | |
|---|---|
| *H04W 24/10* | (2009.01) |
| *H04B 17/336* | (2015.01) |
| *H04L 5/00* | (2006.01) |
| *H04W 74/0833* | (2024.01) |
| *H04W 88/14* | (2009.01) |

(52) U.S. Cl.
CPC .......... *H04W 24/10* (2013.01); *H04B 17/336* (2015.01); *H04L 5/0051* (2013.01); *H04W 74/0833* (2013.01); *H04W 88/14* (2013.01)

(58) Field of Classification Search
CPC .. H04W 72/044; H04W 72/54; H04W 72/541
See application file for complete search history.

(56) References Cited

U.S. PATENT DOCUMENTS

| | | |
|---|---|---|
| 2015/0146542 A1 | 5/2015 | Xia et al. |
| 2017/0237478 A1 | 8/2017 | Kwak et al. |
| 2019/0215086 A1 | 7/2019 | Kwak et al. |
| 2019/0239245 A1 | 8/2019 | Davydov et al. |
| 2019/0342057 A1* | 11/2019 | Rico Alvarino ...... H04W 72/52 |
| 2020/0052767 A1 | 2/2020 | Wang et al. |
| 2020/0077286 A1 | 3/2020 | Liu |
| 2020/0221323 A1 | 7/2020 | Xu et al. |
| 2020/0260358 A1 | 8/2020 | Ratnam et al. |
| 2020/0275482 A1 | 8/2020 | Oh et al. |
| 2021/0219283 A1 | 7/2021 | Xue et al. |

(Continued)

FOREIGN PATENT DOCUMENTS

| | | |
|---|---|---|
| EP | 3031283 A2 | 6/2016 |
| EP | 4022850 A1 | 7/2022 |

(Continued)

*Primary Examiner* — Brian P Cox
(74) *Attorney, Agent, or Firm* — Patterson + Sheridan, L.L.P.

(57) ABSTRACT

Certain aspects of the present disclosure provide techniques for request-based interference management. In some cases, as method performed by a first network entity may include communicating a message with a second network entity, the message including a request related to transmission of one or more measurement reference signals for measuring interference between the first network entity and the second network entity and based on the communicated message, measuring the interference between the first network entity and the second network entity based on one or more measurement reference signals.

32 Claims, 16 Drawing Sheets

(56) References Cited

U.S. PATENT DOCUMENTS

| | | |
|---|---|---|
| 2022/0095240 A1 | 3/2022 | Ying et al. |
| 2022/0182843 A1 | 6/2022 | Park et al. |
| 2022/0278788 A1 | 9/2022 | Pedersen et al. |
| 2022/0408275 A1 | 12/2022 | Awada et al. |
| 2023/0209587 A1 | 6/2023 | Zhang et al. |
| 2023/0328782 A1 | 10/2023 | Zhang et al. |
| 2024/0259837 A1 | 8/2024 | Soldati et al. |

FOREIGN PATENT DOCUMENTS

| | | |
|---|---|---|
| WO | 2019192410 A1 | 10/2019 |
| WO | 2021012129 A1 | 1/2021 |
| WO | 2023212405 A1 | 11/2023 |

* cited by examiner

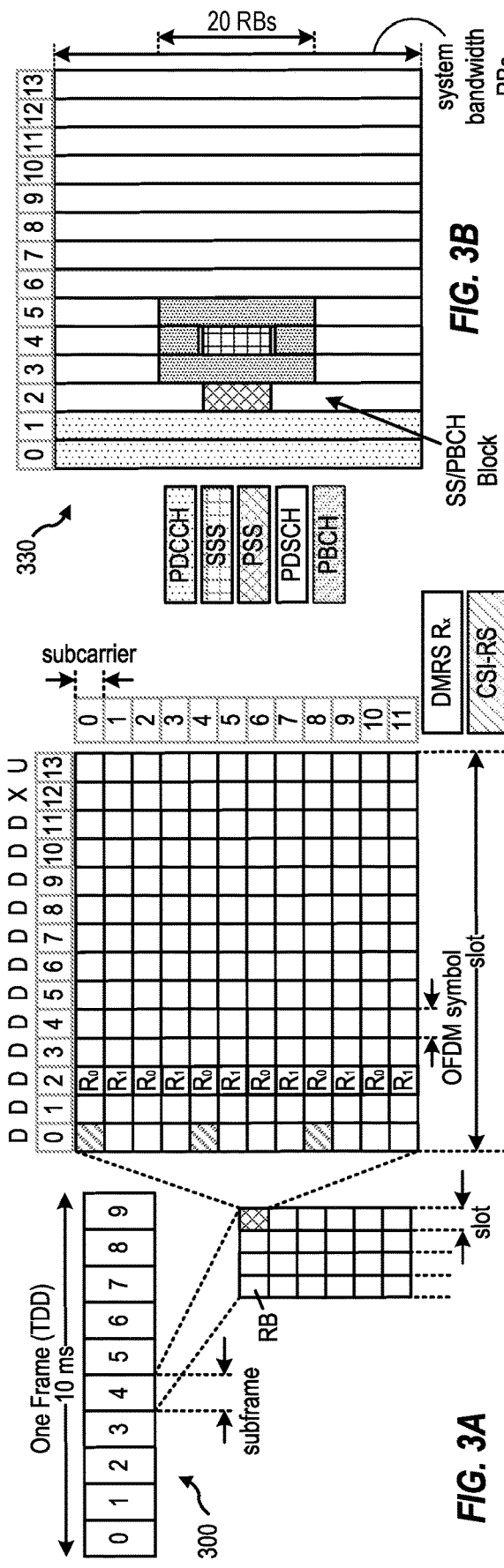
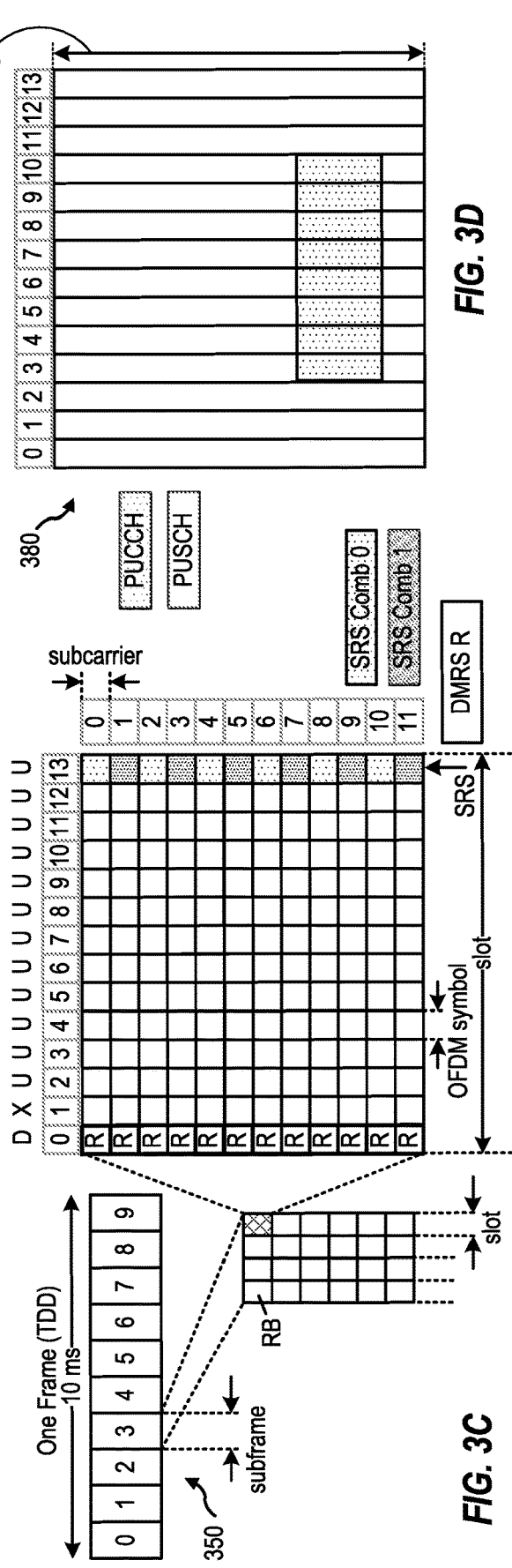

REQUEST-BASED INTERFERENCE MANAGEMENT

BACKGROUND

Field of the Disclosure

Aspects of the present disclosure relate to wireless communications, and more particularly, to techniques for request-based interference management.

Description of Related Art

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available wireless communication system resources with those users Although wireless communication systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communication systems, increasing the ability for different types of devices to intercommunicate, increasing the number and type of wireless communication mediums available for use, and the like. Consequently, there exists a need for further improvements in wireless communications systems to overcome the aforementioned technical challenges and others.

SUMMARY

One aspect provides a method for wireless communication by a first network entity, including communicating a message with a second network entity, the message including a request related to transmission of one or more measurement reference signals for measuring interference between the first network entity and the second network entity; and based on the communicated message, measuring the interference between the first network entity and the second network entity based on one or more measurement reference signals.

One aspect provides a method for wireless communication by a second network entity, including communicating a message with a first network entity, the message including a request related to transmission of one or more measurement reference signals for measuring interference between the first network entity and the second network entity; and transmitting the one or more measurement reference signals based on the communicated message.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 3A, 3B, 3C, and 3D depict various example aspects of data structures for a wireless communication network.

DETAILED DESCRIPTION

Figure 1:
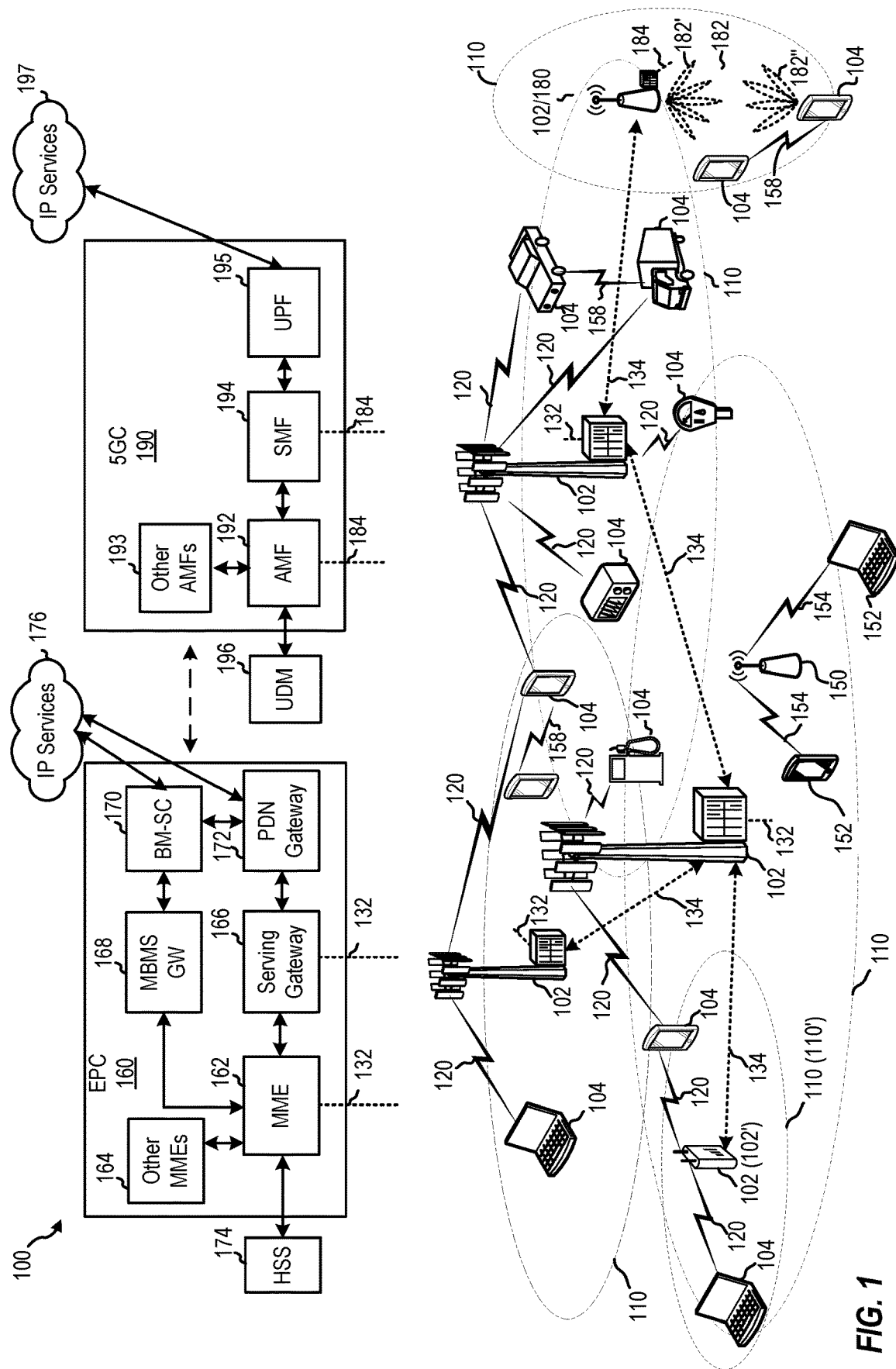
FIG. 1 is a block diagram conceptually illustrating an example wireless communication network.

Aspects of the present disclosure provide apparatuses, methods, processing systems, and computer-readable mediums for request-based interference mitigation negotiation between network entities in a wireless communications network. For example, in some cases, transmissions by one network entity, such as downlink (DL) transmissions from a first network entity, may cause interference with transmissions to another network entity within a transmission window, such as to uplink (UL) transmissions to a second network entity. In such cases, the first network entity may be known as an aggressor network entity and the second network entity may be known as a victim network entity. This interference can cause the UL transmissions to not be correctly received by the second network entity. In such cases, the second network entity would then have to indicate to the sender to retransmit the UL transmissions, unnecessarily consuming additional time and frequency resources within the wireless communications network. Moreover, power resources may be wasted having to retransmit these UL transmissions unnecessarily.

To mitigate this interference, the aggressor network entity and the victim network entity may engage in a technique known as interference management in which the two network entities negotiate for resources for their associated transmissions and receptions. In some cases, interference management may include the aggressor network entity transmitting measurement reference signals (RSs). These measurement RSs may be received the victim network entity and used to estimate the interference between the victim network entity and aggressor network entity. Based on the interference measurements, the victim network entity and the aggressor network entity may engage in resource scheduling negotiation or coordination to reduce the interference between the two network entities in the negotiated resources. For example, in some cases, the victim network entity and aggressor network entity may coordinate with each other to avoid situations in which downlink transmissions from the aggressor network entity overlap with and interfere with uplink transmissions to the victim network entity in a same set of resources.

Generally, measurement RSs may be transmitted by network entities at a relatively long fixed periodicity (e.g., the measurement RSs are transmitted relatively infrequently) so as to not introduce significant transmission overhead. This relatively high fixed periodicity may be adequate for scenarios involving non-mobile or low mobility (e.g., a velocity below a threshold) network entities. However, there may be some scenarios that involve high mobility network entities (e.g., a car, a ship, a train, etc.) capable of moving at velocities greater than or equal to a particular threshold.

Because the locations of high mobility network entities may not remain constant for extended periods of time, interference measurements between network entities may become inaccurate after short periods of time. Moreover, due to a velocity of these high mobility network entities and the infrequently transmitted measurement RSs, the interference measurements may not be able to be updated quickly thereby leading to ineffective interference management and interference caused to transmissions within the wireless communications network. This interference may lead to incorrectly received transmissions and, as a result, wasted time, frequency, and power resources associated with having to retransmit these transmissions.

Accordingly, aspects of the present disclosure provide techniques for improving interference management between network entities in the scenarios described above. For example, in some cases, rather than using interference management techniques that rely on a fixed periodicity of measurement RSs, the techniques presented herein include request-based interference management techniques. Request-based interference management may involve the communication of a request between network entities related to transmission of one or more measurement RSs for measuring interference between the network entities. In some cases, the request may request that a particular network entity transmit measurement RSs more frequently or that another particular network entity monitor for measurement RSs more frequently.

These techniques may help to improve the accuracy of measuring interference between network entities. By improving the accuracy of interference measurements, these network entities may more effectively negotiate/coordinate scheduling to avoid the interference between these network entities. This may reduce the chances that transmissions are incorrectly received and thereby reduce wasted time and frequency resources in the wireless communications network and power resources at wireless devices associated with having to retransmit these transmissions.

Introduction to Wireless Communication Networks

FIG. 1 depicts an example of a wireless communication network 100, in which aspects described herein may be implemented.

Generally, wireless communication network 100 includes various network entities (alternatively, network elements or network nodes), which are generally logical entities associated with, for example, a communication device and/or a communication function associated with a communication device. For example, various functions of a network as well as various devices associated with and interacting with a network may be considered network entities.

In the depicted example, wireless communication network 100 includes base stations (BSs) 102, user equipments (UEs) 104, and one or more core networks, such as an Evolved Packet Core (EPC) 160 and 5G Core (5GC) network 190, which interoperate to provide communications services over various communications links, including wired and wireless links.

BSs 102 wirelessly communicate with UEs 104 via communications links 120. The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

In various aspects, a network entity or network node can be implemented as an aggregated base station, as a disaggregated base station, an integrated access and backhaul (IAB) node, a relay node, a sidelink node, to name a few examples.

Figure 2:
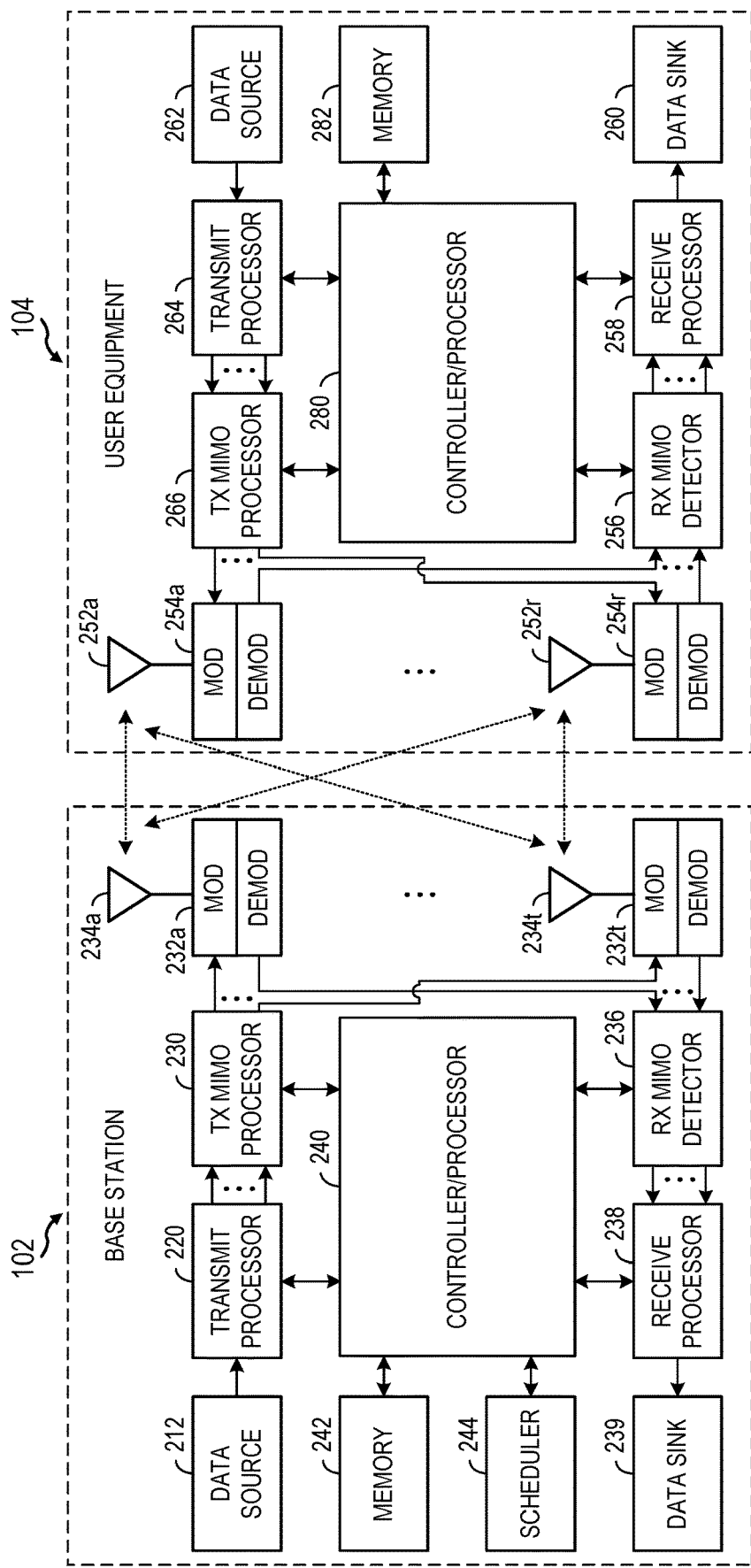
FIG. 2 is a block diagram conceptually illustrating aspects of an example base station and an example user equipment.

FIG. 2 depicts aspects of an example BS 102 and a UE 104.

Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104. BS 102 includes controller/processor 240, which may be configured to implement various functions described herein related to wireless communications.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260). UE 104 includes controller/processor 280, which may be configured to implement various functions described herein related to wireless communications.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to Integrated Access and Backhaul Networks

Figure 4:
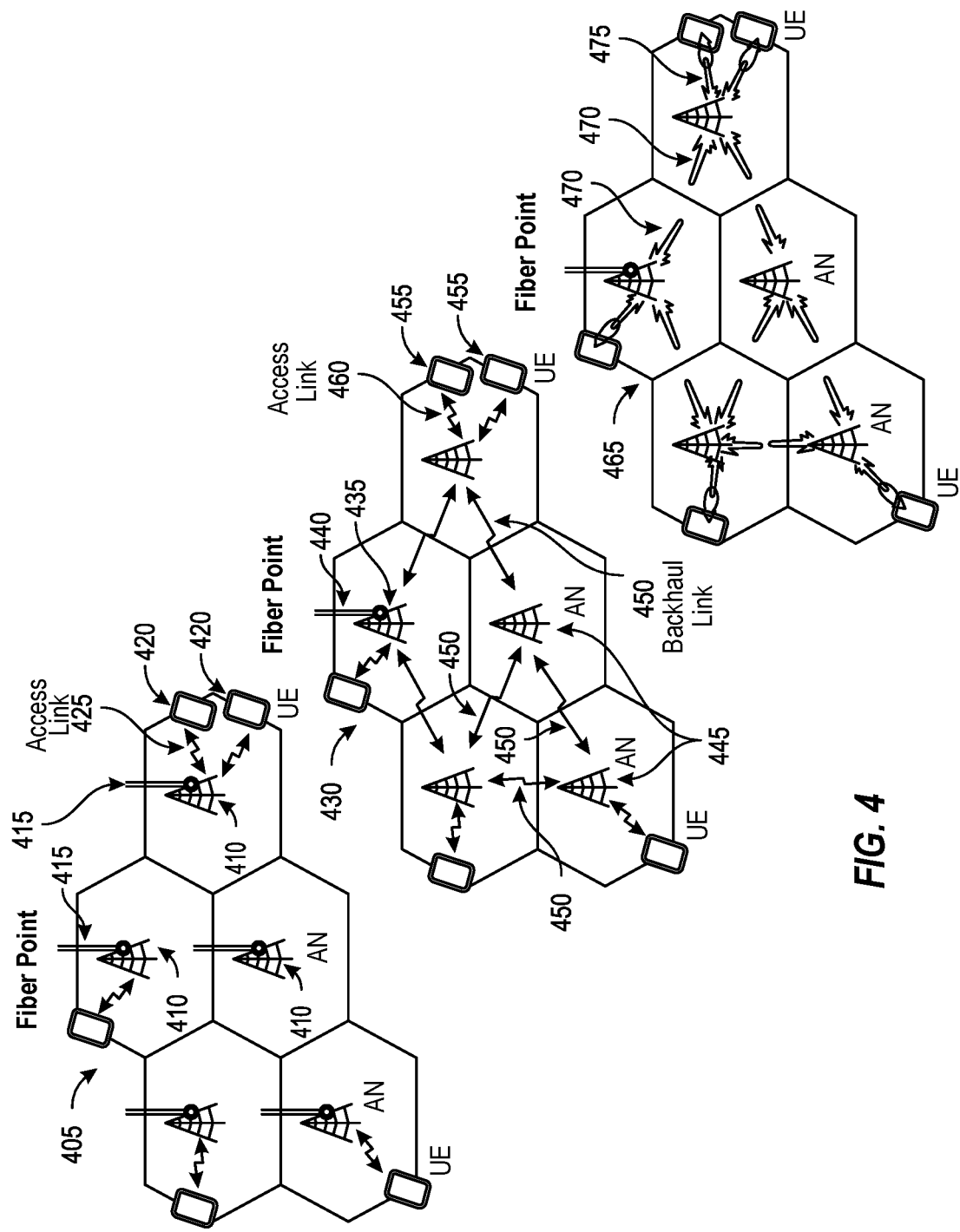
FIG. 4 is a diagram illustrating examples of radio access networks, in accordance with various aspects of the present disclosure.

FIG. 4 is a diagram illustrating examples of radio access networks, in accordance with various aspects of the disclosure.

As shown by reference number 405, a traditional (for example, 3G, 4G, LTE) radio access network may include multiple base stations 410 (for example, access nodes (AN)), where each base station 410 communicates with a core network via a wired backhaul link 415, such as a fiber connection. A base station 410 may communicate with a UE 420 via an access link 425, which may be a wireless link. In some aspects, a base station 410 shown in FIG. 4 may correspond to a BS 102 shown in FIG. 1. Similarly, a UE 420 shown in FIG. 4 may correspond to a UE 104 shown in FIG. 1.

As shown by reference number 430, a radio access network may include a wireless backhaul network. In some aspects or scenarios, a wireless backhaul network may sometimes be referred to as an integrated access and backhaul (IAB) network. An IAB network may include multiple base stations and sometimes the base stations may be of differing types or have differing operational characteristics. For example, in some aspects, an IAB network may have at least one base station that is an anchor base station 435. The anchor base station may communicates with a core network via a wired backhaul link 440, such as a fiber connection. An anchor base station 435 may also be referred to as an IAB donor. Anchor base stations can be configured to communicate with other types of base stations or other communication devices (e.g. in a radio network or IAB network).

The IAB network may also include one or more non-anchor base stations 445. Non-anchor base stations may be referred to as relay base stations or IAB nodes. The non-anchor base station 445 may communicate directly with or indirectly with (for example, via one or more other non-anchor base stations 445) the anchor base station 435 via one or more backhaul links 450 to form a backhaul path to the core network for carrying backhaul traffic. Backhaul link 450 may be a wireless link. Anchor base station(s) 435 or non-anchor base station(s) 445 may communicate with one or more UEs 455 via access links 460, which may be wireless links for carrying access traffic. In some aspects, an anchor base station 435 or a non-anchor base station 445 shown in FIG. 4 may correspond to a BS 102 shown in FIG. 1. Similarly, a UE 455 shown in FIG. 4 may correspond to a UE 104 shown in FIG. 1.

As shown by reference number 465, in some aspects, a radio access network that includes an IAB network may utilize a variety of spectrum types. For example, an IAB network may utilize a variety of differing radio frequency bands. In a few particular examples and according to some aspects, millimeter wave technology or directional communications can be utilized (for example, beamforming, precoding) for communications between base stations or UEs (for example, between two base stations, between two UEs, or between a base station and a UE). In additional or alternative aspects or examples, wireless backhaul links 470 between base stations may use millimeter waves to carry information or may be directed toward a target base station using beamforming, precoding. Similarly, the wireless access links 475 between a UE and a base station may use millimeter waves or may be directed toward a target wireless node (for example, a UE or a base station). In this way, inter-link interference may be reduced.

In some aspects, an IAB network may support a multi-hop network or a multi-hop wireless backhaul. Additionally, or alternatively, each node of an IAB network may use the same radio access technology (for example, 5G/NR). Additionally, or alternatively, nodes of an IAB network may share resources for access links and backhaul links, such as time resources, frequency resources, and spatial resources. Furthermore, various architectures of IAB nodes or IAB donors may be supported.

In some aspects, an IAB donor may include a central unit (CU) that configures IAB nodes that access a core network via the IAB donor and may include a distributed unit (DU) that schedules and communicates with child nodes of the IAB donor.

In some aspects, an IAB node may include a mobile termination component (MT) that is scheduled by and communicates with a DU of a parent node, and may include a DU that schedules and communicates with child nodes of the IAB node. A DU of an IAB node may perform functions described in connection with BS 102 for that IAB node, and an MT of an IAB node may perform functions described in connection with UE 104 for that IAB node.

Figure 5:
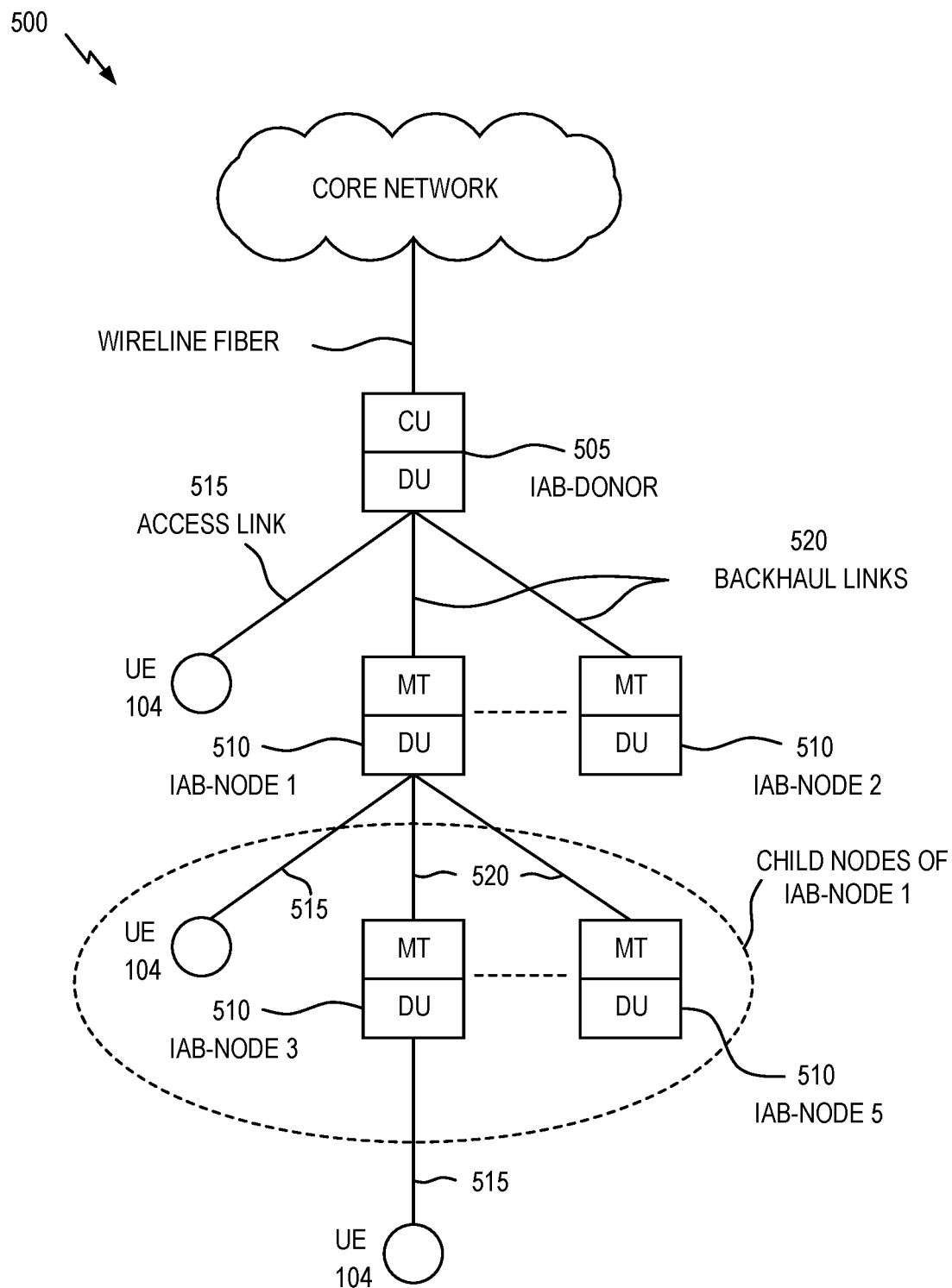
FIG. 5 is a diagram illustrating an example of an integrated access and backhaul (IAB) network architecture in accordance with various aspects of the disclosure.

FIG. 5 is a diagram illustrating an example of an IAB network architecture, in accordance with various aspects of the disclosure. As shown in FIG. 5, an IAB network may include an IAB donor 505 that connects to a core network via a wired connection (for example, as a wireline fiber). For example, an Ng interface of an IAB donor 505 may terminate at a core network. Additionally, or alternatively, an IAB donor 505 may connect to one or more devices of the core network that provide a core access and mobility management function (AMF). In some aspects, an IAB donor 505 may include a BS 102, such as an anchor base station, as described above in connection with FIG. 4. As shown, an IAB donor 505 may include a CU, which may perform ANC functions or AMF functions. The CU may configure a DU of the IAB donor 505 or may configure one or more IAB nodes 510 (for example, an MT or a DU of an IAB node 510) that connect to the core network via the IAB donor 505. Thus, a CU of an IAB donor 505 may control or configure the entire IAB network that connects to the core network via the IAB donor 505, such as by using control messages or configuration messages (for example, a radio resource control (RRC) configuration message, an F1 application protocol (F1AP) message).

As described above, the IAB network may include IAB nodes 510 (shown as IAB nodes 1 through 4) that connect to the core network via the IAB donor 505. As shown, an IAB node 510 may include an MT and may include a DU. The MT of an IAB node 510 (for example, a child node) may be controlled or scheduled by another IAB node 510 (for example, a parent node) or by an IAB donor 505. The DU of an IAB node 510 (for example, a parent node) may control or schedule other IAB nodes 510 (for example, child nodes of the parent node) or UEs 104. Thus, a DU may be referred to as a scheduling node or a scheduling component, and an MT may be referred to as a scheduled node or a scheduled component. In some aspects, an IAB donor 505 may include a DU and not an MT. That is, an IAB donor 505 may configure, control, or schedule communications of IAB nodes 510 or UEs 104. A UE 104 may include only an MT, and not a DU. That is, communications of a UE 104 may be controlled or scheduled by an IAB donor 505 or an IAB node 510 (for example, a parent node of the UE 104).

According to some aspects, certain nodes may be configured to participate in control/scheduling processes. For example in some aspects, when a first node controls or schedules communications for a second node (for example, when the first node provides DU functions for the second node's MT), the first node may be referred to as a parent node of the second node, and the second node may be referred to as a child node of the first node. A child node of the second node may be referred to as a grandchild node of the first node. Thus, a DU of a parent node may control or schedule communications for child nodes of the parent node. A parent node may be an IAB donor 505 or an IAB node 510, and a child node may be an IAB node 510 or a UE 104. Communications of an MT of a child node may be controlled or scheduled by a parent node of the child node.

As further shown in FIG. 5, a link between a UE 104 and an IAB donor 505, or between a UE 104 and an IAB node 510, may be referred to as an access link 515. Each access link 515 may be a wireless access link that provides a UE 104 with radio access to a core network via the IAB donor 505, and potentially via one or more IAB nodes 510.

As further shown in FIG. 5, a link between an IAB donor 505 and an IAB node 510, or between two IAB nodes 510, may be referred to as a backhaul link 520. Each backhaul link 520 may be a wireless backhaul link that provides an IAB node 510 with radio access to a core network via the IAB donor 505, and potentially via one or more other intermediate IAB nodes 510. In some aspects, a backhaul link 520 may be a primary backhaul link or a secondary backhaul link (for example, a backup backhaul link). In some aspects, a secondary backhaul link may be used if a primary backhaul link fails, becomes congested, or becomes overloaded. In an IAB network, network resources for wireless communications (for example, time resources, frequency resources, spatial resources) may be shared between access links 515 and backhaul links 520.

Introduction to Multi-Antenna Panel and Full Duplex Communication

In certain systems, such as the wireless communication network 100 of FIG. 1 and the radio access networks of FIG. 4, UEs and BSs may be able to transmit or receive transmissions using multiple antennas, beams, and/or antenna panels (e.g., antenna element arrays). An antenna panel may comprise a collection of transceiver units (TXRUs) that are capable of generating an analog beam. In some cases, when a dual-polarized array is used, the one beam may correspond to two antenna ports. In some cases, same sets or different sets of antenna panels can be used for DL reception and UL transmission. For example, in some cases, the same set of antenna panels may be used for both DL reception and UL transmission while in other cases different sets of antenna panels could be used for DL reception as compared to UL transmission.

Additionally, antenna panels can be associated with the same as well as different numbers of antenna ports, a number of beams, and/or an effective isotropic radiated power (EIRP). In some cases, while different antenna panels may share a same number of beams, there may not be beam correspondence across different antenna panels. Further, in some cases, each antenna panel may be associated with the same or independent operation parameters, such as power control (PC) parameters, a fast Fourier transform timing window, a time advance (TA) parameter, and the like. Additionally, each antenna panel of the UE may be associated with a particular panel identifier (ID) or an antenna panel group ID. In some cases, the antenna panel ID or antenna panel group ID may include one or more of a beam group ID, a transmission configuration indicator (TCI) state pool ID, a sounding reference signal (SRS) resource group ID, a control resource set (CORESET) pool ID, or a closed loop power control index.

In some cases, the capability to perform transmissions using multiple panels may be especially useful for higher frequency transmission, such as millimeter wave transmissions described above. In some cases, the transmissions associated with a UE may be received from or transmitted to a serving BS or transmission reception point (TRP) via a Uu interface. Generally, transmissions using multiple antenna panels may allow for increased throughput (e.g., by simultaneously or concurrently transmitting/receiving data to/from the BS using the multiple antenna panels) and/or increased reliability (e.g., by sending/receiving the same information using the multiple antenna panels). Such transmissions may be referred to as multi-panel transmissions.

As noted above, in some cases, wireless communication devices, such as UEs and BSs, may communicate using multiple antenna panels. In some cases, the multiple antenna panels may be used for half-duplex (HD) communication, such as in current 5G new radio (NR) communication systems, in which downlink (DL) and uplink (UL) transmissions are transmitted non-simultaneously (e.g., transmitted in different time resources). In other cases, the use of multiple antenna panels may allow for full duplex (FD) communication whereby uplink (UL) and downlink (DL) transmissions may be performed simultaneously (e.g., in the same time resources). For example, in some cases, UL transmission by the UE may be performed on one panel while DL reception may be performed simultaneously on another panel of the UE. Likewise, at a BS, DL transmission by the BS may be performed on one antenna panel while UL reception may be performed on another antenna panel.

FD capability may be conditioned on beam separation (e.g., frequency separation or spatial separation) and may still be subject to certain self-interference between UL and DL (e.g., UL transmission directly interferes with DL reception) as well as clutter echo (e.g., where UL transmission echoes affect UL transmission and/or DL reception). However, while FD capability may be subject to certain interference, FD capability provides for reduced transmission and reception latency (e.g., it may be possible to receive DL transmissions in an UL-only slot), increased spectrum efficiency (e.g., per cell and/or per UE), and more efficient resource utilization.

Figure 6A:
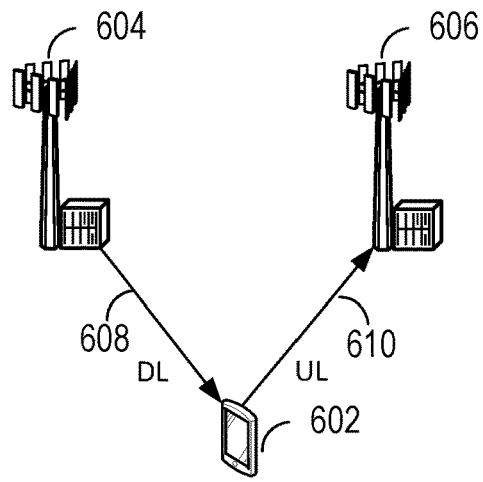
FIGS. 6A, 6B, and 6C illustrates different full-duplex use cases within a wireless communication network.
Figure 6B:
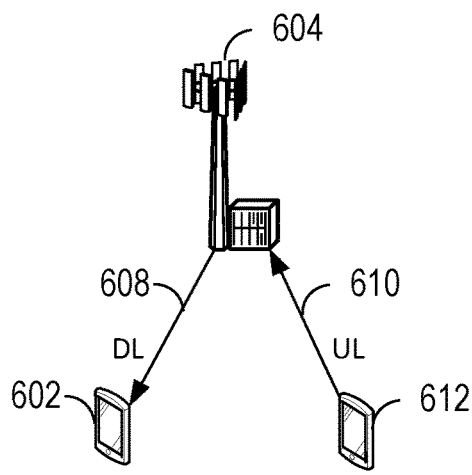
Figure 6C:
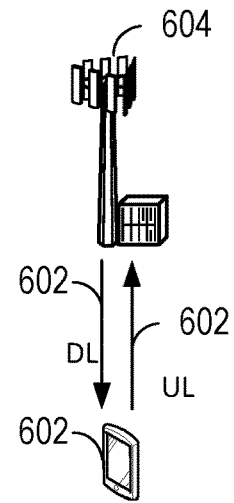

FIGS. 6A-6C illustrates different FD use cases within a wireless communication network, such as the wireless communication network 100. For example, FIG. 6A illustrates a first FD use case involving transmission between one UE 602 and two base stations (or multiple transmission reception points (mTRP)), BS 604 and BS 606. In some cases, UE 602 may be representative of UE 104 of FIG. 1 and BSs 604, 606 may be representative of BS 102 of FIG. 1. As shown, the UE 602 may simultaneously receive DL transmissions 608 from the BS 606 and transmit UL transmissions 610 to the BS 606. In some cases, the DL transmissions 608 and UL transmissions 610 may be performed using different antenna panels to facilitate the simultaneous transmission and reception.

A second FD use case is illustrated in FIG. 6B involving two different UEs and one BS. As illustrated, the UE 602 may receive DL transmissions 608 from the BS 604 while another UE 612 may simultaneously transmit UL transmission 610 to the BS 604. Thus, in this example, BS 604 is conducting simultaneous uplink and downlink communications.

A third FD use case is illustrated in FIG. 6C involving one BS and one UE. As illustrated, the UE 602 may receive DL transmissions 608 from the BS 604 and may simultaneously transmit UL transmissions 610 to the BS 604. As noted above, such simultaneous reception/transmission by the UE 602 may be facilitated by different antenna panels.

Table 1, below, illustrates various example scenarios in which each of the FD use cases may be used.

TABLE 1

| Base Station | UE | FD use case |
| --- | --- | --- |
| FD disabled | FD disabled | Baseline 5G behavior |
| FD disabled | FD enabled | Use case #1 (FIG. 6A) for mTRP |
| FD enabled | FD disabled | Use case #2 (FIG. 6B) + IAB |
| FD enabled | FD enabled | Use case #3 (FIG. 6C) |

As shown, if FD capability is disabled at both the base station and UE, the baseline 5G behavior may be used (e.g., HD communication). If FD capability is disabled at the BS but enabled at the UE, the UE may operate according to the first example FD use case shown in FIG. 6A in which the UE may communicate with two different TRPs simultaneously (e.g., simultaneous UL and DL transmissions) using two different antenna panels. If FD is enabled at the BS but disabled at the UE (e.g., the UE is not capable of FD), the BS may operate according to the second example FD use case shown in FIG. 6B in which the BS may communicate with two different UEs simultaneously (e.g., simultaneous UL and DL transmissions) using two different antenna panels. Finally, if FD is enabled at both the BS and the UE, the BS and UE may operate according to the third example FD use case shown in FIG. 6C in which the BS and UE may communicate with each other simultaneously on the UL and DL, each of the BS and UE using different antenna panels for UL and DL transmissions.

FD communication may be facilitated through the use of frequency division multiplexing (FDM) or spatial division multiplexing (SDM). In FDM, the simultaneous UL and DL transmissions may be transmitted in the same time resources but on separate frequency bands separated by some guard band. In SDM, the simultaneous UL and DL transmissions may transmitted on the same time and frequency resources but spatially separated into different, directional transmission beams. Such FD communication contrasts with HD communication that uses time division multiplexing (TDM) in which UL and DL transmissions are scheduled on the same or different frequency resources, but different time resources.

Introduction to Inter-Base Station Interference

Figure 7A:
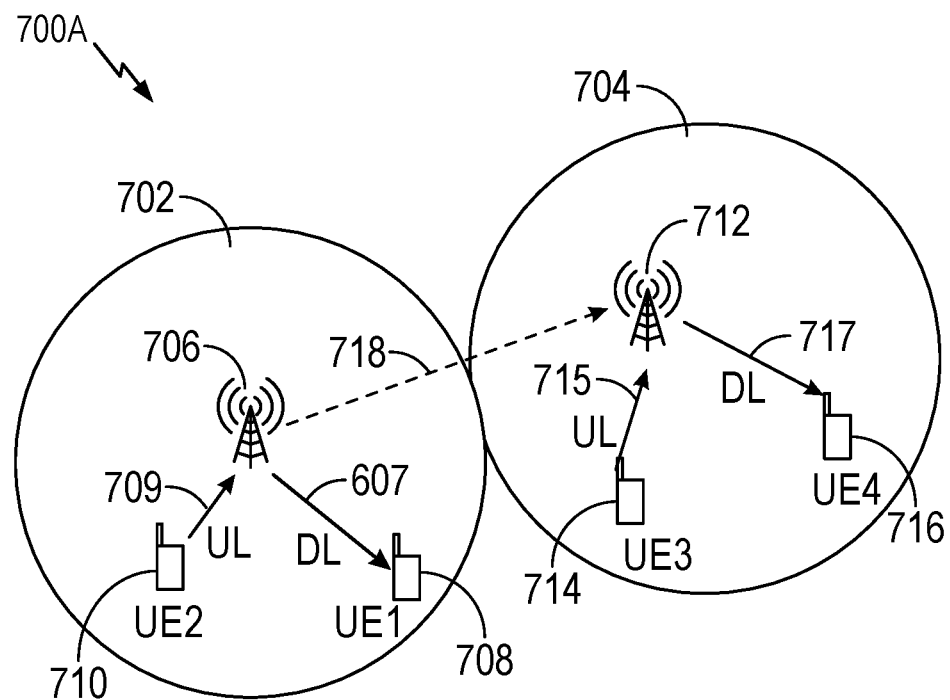
FIGS. 7A and 7B illustrate example interference scenarios in wireless communications networks.
Figure 7B:
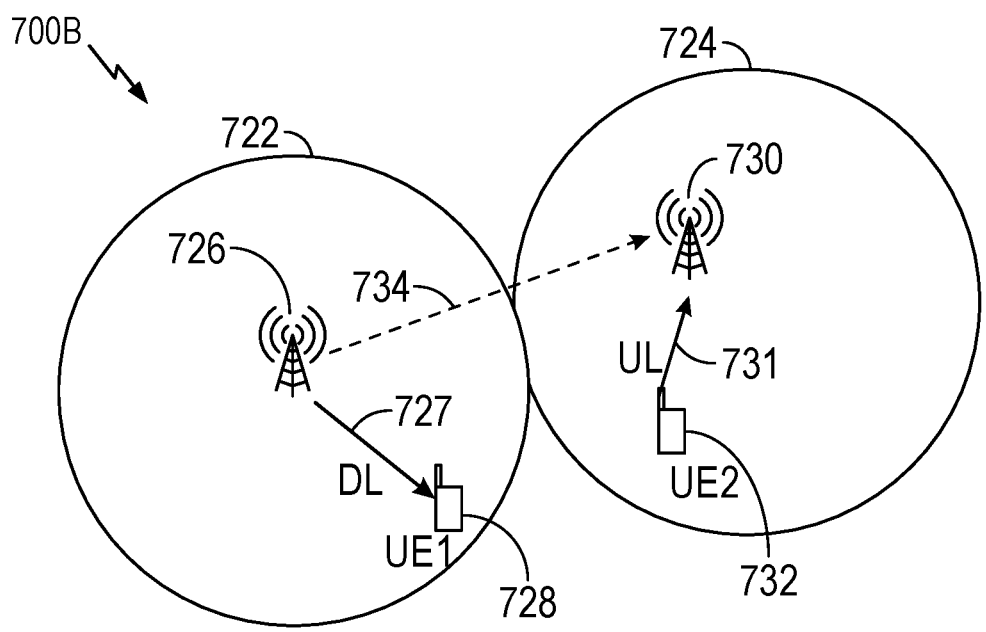

As noted above, FD communication provides for reduced transmission and reception latency and increased spectrum efficiency; however, wireless communications devices, such as base stations, that use FD communication may still be susceptible to certain interferences, such as interference from neighboring base stations, known as cross link interference or downlink-to-uplink interference. FIGS. 7A and 7B illustrate interference scenarios that may occur within wireless communications networks 700A and 700B in which FD and HD communications, respectively, may be used. In some cases, the wireless communications networks 700A and 700B may be examples of the wireless communications network 100 of FIG. 1.

FIG. 7A illustrates an example interference scenario in a wireless communications network 700A in which downlink transmissions from one FD base station (e.g., an aggressor base station) to a first UE causes cross link interference to the uplink transmissions by a second UE to a second FD base station (e.g., a victim base station).

For example, as illustrated, the wireless communications network 700A includes a first cell 702 and a second cell 704. The first cell 702 includes a first FD base station 706, which is capable of FD communication with a first UE 708 and a second UE 710. For example, as shown, the first FD base station 706 may be capable of transmitting downlink (DL) transmissions 705 to the first UE 708 while simultaneously receiving uplink (UL) transmissions 709 from the second UE 710. Similarly, the second cell 704 includes a second FD base station 712, which is capable of FD communication with a third UE 714 and a fourth UE 716. For example, as shown, the second FD base station 712 may be capable of transmitting DL transmissions 717 to the fourth UE 716 while simultaneously receiving UL transmissions 715 from the third UE 714. In some cases, the first FD base station 706 and second FD base station 712 may be examples of the BS 102 illustrated in FIGS. 1 and 2. Likewise, the first UE 708, the second UE 710, the third UE 714, and the fourth UE 716 may be examples of the UE 104 illustrated in FIGS. 1 and 2.

In some cases, because the first cell 702 and second cell 704 are located adjacent to each other, transmissions by the first FD base station 706 may impact transmissions to the second FD base station 712 and vice versa. For example, in some cases, the DL transmissions 705 from the first FD base station 706 have the potential to cause crosslink interference 718 to the UL transmissions 715 from the third UE 714 to the second FD base station 712. In this scenario, the first FD base station 706 may be known as an aggressor base station while the second FD base station 712 may be known as a victim base station.

FIG. 7B illustrates a similar interference scenario in a wireless communications network 700B in which downlink transmissions from one HD base station (e.g., an aggressor base station) to a first UE causes cross link interference to the uplink transmissions by a second UE to a second HD base station (e.g., a victim base station). This interference scenario can arise when the first and second HD base stations are configured with flexible and misaligned time division duplexing (TDD) patterns, resulting in DL transmissions from the first HS base station overlapping with the UL transmissions to the second HD base station.

For example, as illustrated, the wireless communications network 700B includes a first cell 722 and a second cell 724. The first cell 722 includes a first HD base station 726, which is capable of HD communication with a first UE 728. Similarly, the second cell 724 includes a second HD base station 730, which is capable of HD communication with a second UE 732. In some cases, the first HD base station 726 and second HD base station 730 may be examples of the BS 102 illustrated in FIGS. 1 and 2. Likewise, the first UE 728 and the second UE 732 may be examples of the UE 104 illustrated in FIGS. 1 and 2.

Generally, it may be advantageous for the first HD base station 726 and the second HD base station 730 to be configured with a same TDD pattern, such that each base station is configured to transmit DL transmission at the same time and receive UL transmissions at the same time, avoiding crosslink interference. However, there may be instances in which the first HD base station 726 and the second HD base station 730 are configured with flexible and misaligned TDD patterns, resulting in overlapping UL and DL transmissions between the first HD base station 726 and the second HD base station 730. For example, as illustrated, in some cases, the first HD base station 726 may be configured to transmit DL transmissions 727 to the first UE 728 at the same time that the second HD base station 730 is configured to receive UL transmissions 731 from the second UE 732. In such cases, the DL transmissions 727 by the first HD base station 726 may cause crosslink interference 734 to the UL transmissions 731 received by the second HD base station 730. In this scenario, the first HD base station 726 may be known as an aggressor base station while the second HD base station 730 may be known as a victim base station.

Whether experienced in the FD scenario illustrated in FIG. 7A or the HD scenario illustrated in FIG. 7B, crosslink interference is disadvantageous and can lead to certain negative effects. For example, crosslink interference can cause the UL transmission to not be correctly received by the second base station (e.g., victim base station). In such cases, the second base station would then have to indicate to its served UE (e.g., the third UE 714 in FIG. 7A or the second UE 732 in FIG. 7B) to retransmit the UL transmissions, unnecessarily consuming additional time and frequency resources within the wireless communications networks 700A and 700B. Moreover, power resources may be wasted having to retransmit these UL transmissions unnecessarily.

Aspects Related to Request-Based Interference Management

As noted above, there certain instances in time in which transmissions by a first network entity (e.g., a base station (BS), and integrated access and backhaul (IAB) node, a distributed unit (DU), etc.) cause interference to transmissions associated with a second network entity, known a cross-link interference (CLI). In this scenario, the first network entity may be referred to as an aggressor network entity (e.g., the network entity causing the interference) while the second network entity may be referred to as a victim network entity (e.g., the network entity experiencing the interference). In other instances in time, transmissions by the second network entity may cause interference to transmissions associated with the first network entity. Thus, in these cases, the second network entity may be considered the aggressor network entity while the first network entity may be considered the victim network entity.

In either scenario, to mitigate this interference, the aggressor network entity and the victim network entity may engage in a technique known as interference management in which the two network entities negotiate for resources for their associated transmissions. In some cases, interference management may include the aggressor network entity autonomously and periodically transmitting measurement reference signals (RSs) using different transmit (Tx) beams. The victim network entity may then receive these measurement RSs using different receive (Rx) beams and perform CLI measurements based on the received measurement RSs. In some cases, each measurement RS transmitted by the aggressor network entity may be associated with a particular Tx/Rx beam pair between the aggressor network entity and victim network entity. Based on the CLI measurements, the victim network entity and the aggressor network entity may engage in resource scheduling negotiation or coordination to reduce CLI between the two network entities in the negotiated resources.

In general, measurement RSs may be transmitted by network entities at a relatively long fixed periodicity (e.g., the measurement RSs are transmitted relatively infrequently, such as every N hundreds of milliseconds) so as to not introduce significant transmission overhead. This relatively long fixed periodicity may be adequate for scenarios involving non-mobile or low mobility (e.g., a velocity below a threshold, such as less than approximately a few meters/second (m/s)) network entities and when changes to the environment in which these BSs are operating are infrequent. However, there may be other scenarios involving high mobility network entities (e.g., with a velocity greater than or equal to the threshold, such as greater than 4-5 m/s) operating in a same environment as low mobility network entities. In such scenarios, the relatively long fixed periodicity may not be sufficient to accurately measure CLI in these environments due to the velocity of the high mobility network entities.

In other words, due to the velocity of certain high mobility network entities, CLI measurements may not be accurate, preventing CLI from being mitigated properly. This issue is exacerbated by the fact that the mobility of these high mobility network entities (e.g., where these network entities are geographically located and where they plan on moving) is unpredictable. Moreover, there may even be scenarios involving low mobility network entities in which the environment in which these network entities operate changes significantly and quick enough to reduce the accuracy of CLI measurements based on measurement RSs transmitted according to the relatively long fixed periodicity.

When the accuracy of the CLI measurements is reduces, network entities may not be able to effectively negotiate or coordinate scheduling to avoid CLI. As such, transmissions associated with these network entities may still experience CLI. As noted above, this CLI may cause these transmissions to not be received correctly, leading to the unnecessary consumption of time and frequency resources within a wireless network and power resources at wireless devices associated with having to retransmit these incorrectly received transmissions.

Therefore, aspects of the present disclosure provide techniques for improving interference management between network entities (e.g., BSs, IAB nodes, DUs, etc.) in the scenarios described above. For example, in some cases, rather than using interference management techniques that rely on a fixed periodicity of measurement RSs, the techniques presented herein include request-based interference management techniques. Request-based interference management may involve the communication of a request between network entities related to transmission of one or more measurement RSs for measuring interference between the network entities.

For example, in some cases, the request may be transmitted from a victim network entity (e.g., BS, IAB node, DU, etc.) to an aggressor network entity (e.g., BS, IAB node, DU, etc.) to request the aggressor network entity to transmit the one or more measurement RSs. In some cases, the request from the victim network entity to the aggressor network entity may request that the aggressor network entity decrease a transmission periodicity associated with transmitting the one or more RSs (e.g., such that the one or more measurement RSs are transmitted more frequently). In some cases, the request may be transmitted from the aggressor network entity to the victim network entity and may request that the victim network entity decrease a monitoring periodicity associated with the one or more measurement RSs (e.g., such that the victim network entity monitors for the one or more measurement RSs more frequently.

These techniques may help to improve the accuracy of measuring interference between network entities. By improving the accuracy of interference measurements, these network entities may more effectively negotiate/coordinate scheduling to avoid the interference between these network entities. This may reduce the chances that transmissions are incorrectly received and thereby reduce wasted time and frequency resources in wireless networks and power resources at wireless devices associated with having to retransmit these transmissions.

Figure 8:
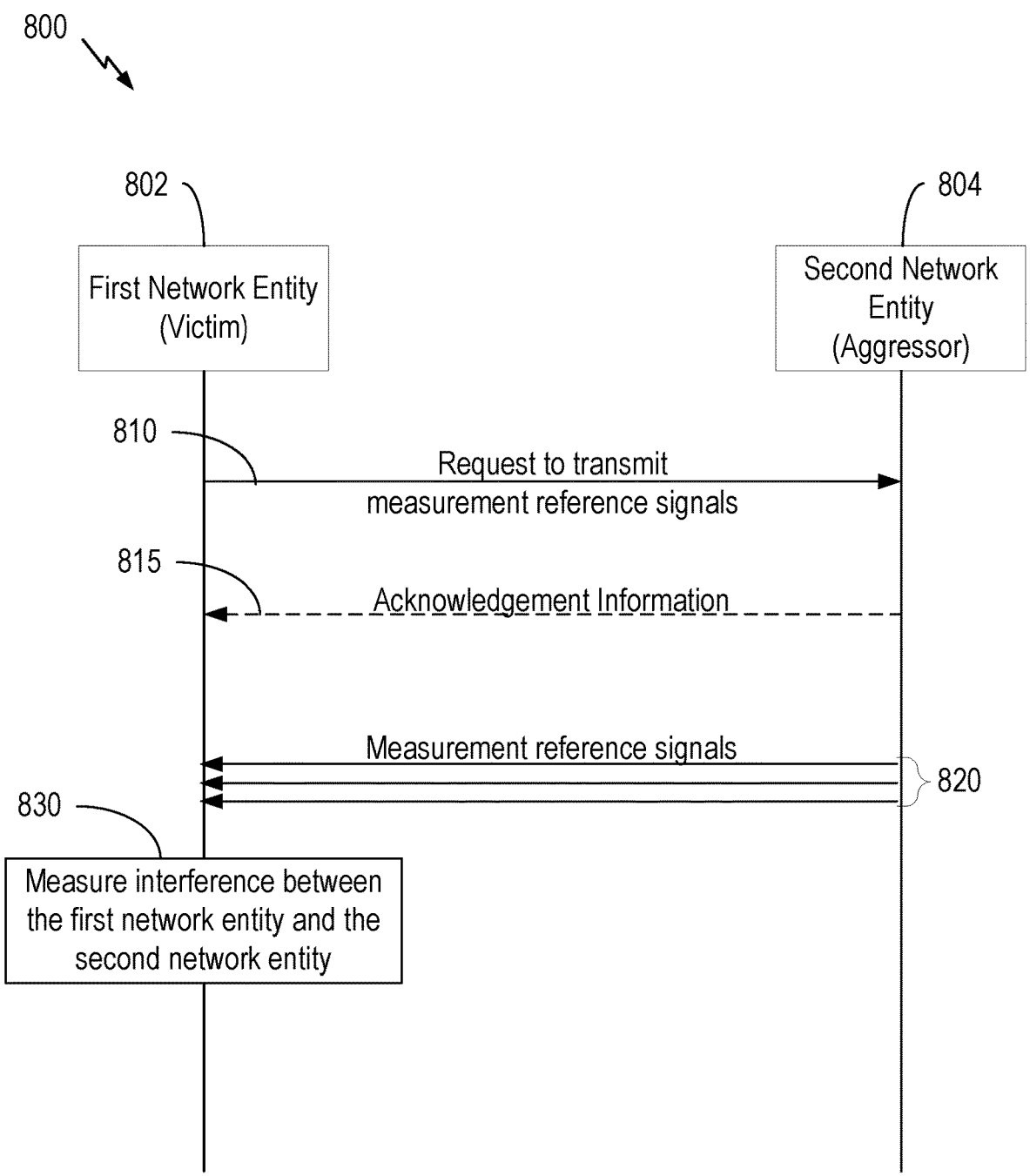
FIG. 8 depicts a process flow illustrating example operations for communication in a network between a first network entity and a second network entity.

Example Operations Between Non-Mobile or Low-Mobility Network Entities in a Communication Network for Request-Based Interference Management FIG. 8 depicts a process flow illustrating example operations 800 for communication in a network between a first network entity 802 and a second network entity 804. In some aspects, the first network entity 802 and second network entity 804 may be examples of the BS 102 depicted and described with respect to FIGS. 1 and 2. In some aspects, the first network entity 802 and second network entity 804 may be examples of an IAB node, such as one of the IAB nodes 510 illustrated in FIG. 5. In some cases, the first network entity 802 and second network entity 804 may be non-mobile (e.g., stationary) or low mobility (e.g., semi-stationary). Low mobility may include, for example, moving at a velocity below a certain threshold or remaining stationary for an extended period of time (e.g., a threshold amount of time) prior to moving locations.

In some cases, because the first network entity 802 and second network entity 804 are non-mobile or low-mobility an environment within which the first network entity 802 and the second network entity 804 operate may be relatively static. As a result, due to the relatively static nature of the environment in which the first network entity 802 and the second network entity 804 operate, measurement reference signals (RSs) may be configured with a long periodicity. This long periodicity may be sufficient to allow for accurate interference measurements between the first network entity 802 and the second network entity 804 since the environment is relatively static. In some cases, the measurement RSs may even be configured only once, such as when the first network entity 802 and the second network entity 804 are brought online in the environment (e.g., assuming no possible changes to the environment).

However, there may be instances in which, while the first network entity 802 and the second network entity 804 are non-mobile or low mobility, the environment in which the first network entity 802 and the second network entity 804 changes. For example, in some cases, other network entities may be introduced into the environment, buildings may be erected, either of the first network entity 802 or the second network entity 804 may be moved to a different location within the environment, etc., each of which may affect the manner in which the first network entity 802 and the second network entity 804 perform transmissions. This change in environment may render previous interference measurements between the first network entity 802 and the second network entity 804 inaccurate for the present environment, leading to interference between the first network entity 802 and the second network entity 804. Moreover, due to the long periodicity of measurement RSs (or in some cases, only a single measurement RS transmission), the measurement RSs may not be accurately measured in time to avoid interference between the first network entity 802 and the second network entity 804, resulting in incorrectly received transmissions.

For example, due to the change in environment, there may be cases in which transmissions by the second network entity 804 may interfere with transmissions associated with the first network entity 802. In such cases, the second network entity 804 may be considered an aggressor network entity while the first network entity 802 may be considered a victim network entity. In some cases, to help improve accuracy of interference measurements and avoid interference between the first network entity 802 and the second network entity 804, in some cases, the first network entity 802 (e.g., the victim network entity) may send a request to the second network entity 804 (e.g., the aggressor network entity) to transmit one or more measurements RSs.

For example, in some cases, the first network entity 802 communicates a message with the second network entity. In some cases, the message includes a request related to transmission of one or more measurement reference signals for measuring interference between the first network entity 802 and the second network entity 804. More specifically, for example, as shown in step 810 in FIG. 8, the first network entity 802 transmits the message including the request to the second network entity 804. In some cases, the request in the message requests the second network entity 804 to transmit the one or more measurement RSs.

In some cases, the second network entity 804 may optionally transmit acknowledgement information to the first network entity 802 in step 815 based on the request received in the message in step 810. For example, the second network entity 804 may transmit positive acknowledgement information in step 815, indicating to the first network entity 802 that the second network entity 804 will comply with the request received in step 810 and will transmit one or more measurement RSs. In other cases, the second network entity 804 may transmit negative acknowledgement information in step 815, indicating to the first network entity 802 that the second network entity 804 will not comply with the request received in step 810 and will not transmit the one or more measurement RSs based on the request.

In response to receiving the request (and, in some cases, transmitting positive acknowledgement information), the second network entity 804 transmits the one or more measurement RSs, as shown at step 820 in FIG. 8. Thereafter, in response to the communicated message in step 810 and to receiving the one or more measurement RS from the second network entity 804 in step 820, the first network entity 802 measures the interference between the first network entity 802 and the second network entity 804 based on the one or more measurement RSs received from the second network entity 804, as shown at step 830. The first network entity 802 and second network entity 804 may then negotiate/coordinate scheduling, based on the interference measurements, to reduce or manage interference between the first network entity 802 and second network entity 804.

Aspects Related to Interference Management Involving a High Mobility Aggressor Network Entity and a Stationary or Low Mobility Victim Network Entity As noted above, there may be scenarios in which certain network entities (e.g., BSs, IAB nodes, DUs, etc.) are mobile or move with a velocity greater than or equal to a threshold. When these mobile network entities enter an environment with stationary or low mobility network entities, the mobile network entities may act as aggressors, causing interference to transmissions associated with the stationary or low mobility network entities. This scenario is illustrated in FIG. 9.

Figure 9:
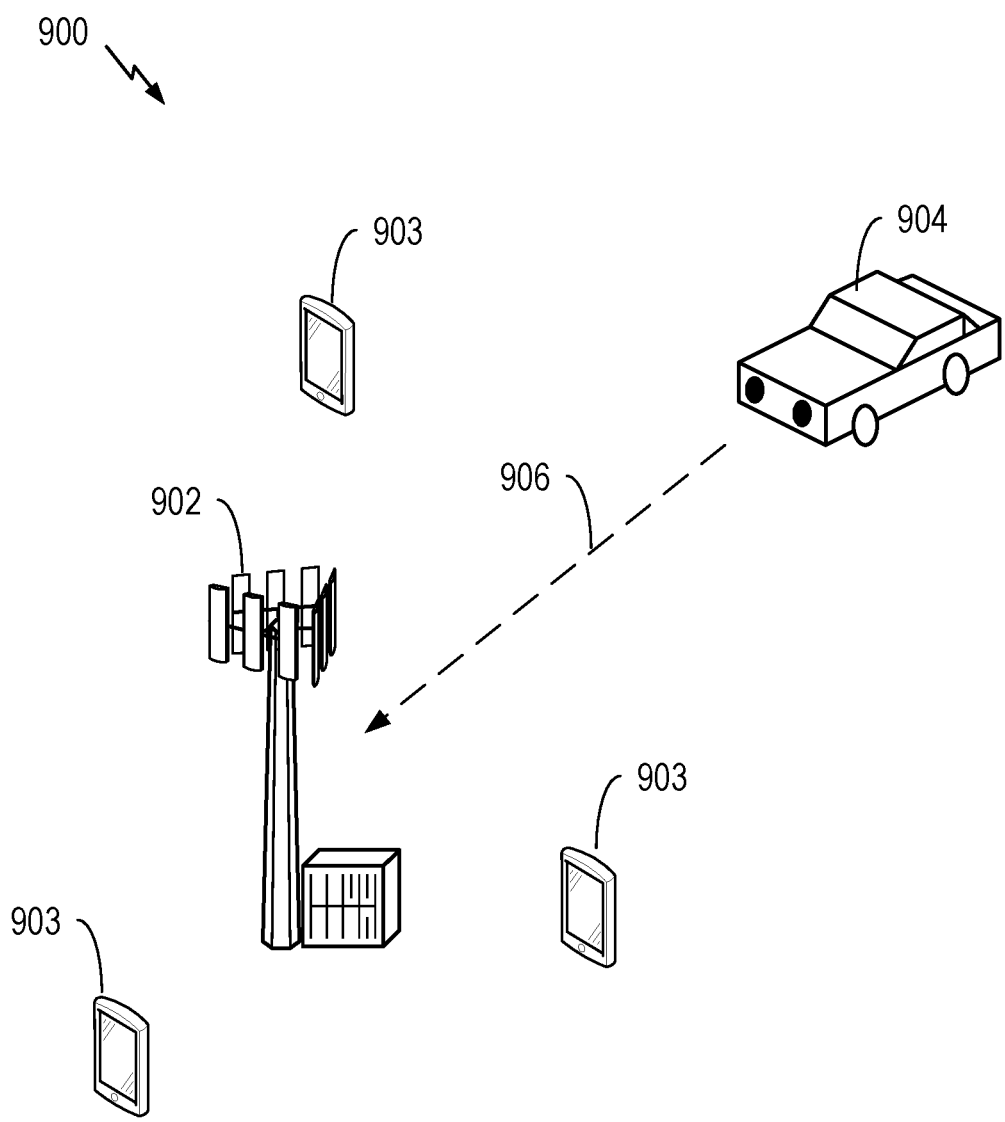
FIG. 9 illustrates a wireless communications environment that includes a first network entity and a second network entity.

In particular, FIG. 9 illustrates a wireless communications environment 900 that includes a first network entity 902 and a second (mobile) network entity 904. In some aspects, the first network entity 902 and second network entity 904 may be examples of the BS 102 depicted and described with respect to FIGS. 1 and 2 or one or more components of the BS 102, such as a distributed unit (DU). In some aspects, the first network entity 902 and second network entity 904 may be examples of an IAB node, such as one of the IAB nodes 510 illustrated in FIG. 5.

In some cases, the first network entity 902 may be stationary (e.g., non-mobile) while the second network entity 904 may have high mobility. Due to the high mobility of the second network entity 904, the second network entity 904 may be capable of unpredictably moving to different locations within the wireless communications environment 900, which may cause interference between the first network entity 902 and the second network entity 904 as shown at 906 in FIG. 9. For example, For example, as shown in FIG. 9, the second network entity 904 may cause interference to transmissions by or to the first network entity 902 associated with UEs 903 served by the first network entity 902. As a result, in this scenario, the second network entity 904 may be considered an aggressor network entity while the first network entity 902 may be considered a victim network entity.

In some cases, the high mobility of the second network entity 904 may cause issues with interference measurements performed by the (stationary/low mobility) first network entity 902. For example, as noted above, interference measurements may be performed by a victim network entity (e.g., the first network entity 902) for various TX/RX beam pairs between an aggressor network entity (e.g., the second network entity 904) and the victim network entity. However, these TX/RX beam pairs used to perform the interference measurements may be spatially related and depend on the geographical locations of the aggressor network entity and the victim network entity.

Due to the dependence of TX/RX beam pairs on the geographical locations of the first network entity 902 and the second network entity 904, when the (high mobility) second network entity 904 moves locations relative to the (stationary/low mobility) first network entity 902, the TX/RX beam pairs and associated interference measurements between the first network entity 902 and the second network entity 904 may no longer be accurate and would need to be updated. However, due to the velocity of the (aggressor) second network entity 904, any updated interference measurements performed by the (victim) first network entity 902 may quickly become outdated. Moreover, given the long/infrequent transmission periodicity of the measurement RSs by the (aggressor) second network entity 904 and corresponding long/infrequent measuring periodicity by the first network entity 902, the first network entity 902 may not be able to quickly update these outdated and inaccurate interference measurements.

To help resolve these issues, in some cases, rather than transmitting measurement RSs at a long periodicity (e.g., infrequently), the (aggressor) second network entity 904 may instead decide to transmit the measurement RSs using a shorter periodicity (e.g., more frequently). Transmitting the measurement RSs more frequently may allow for more accurate interference measurements. However, while the second network entity 904 may be able to autonomously decide to transmit the measurement RSs more frequently, the (victim) first network entity 902 may still be configured to monitor for the measurement RSs according to a longer periodicity (infrequently), resulting in inaccurate interference measurement. In some cases, to help avoid this problem, the second network entity 904 may transmit a request to the first network entity to decrease a measuring periodicity associated with measuring measurement RSs from the second network entity 904. Decreasing the measuring periodicity may allow the first network entity 902 to monitor for and measure the measurement RSs more frequently (e.g., in accordance with a periodicity at which the measurement RSs are transmitted by the second network entity 904) and to more accurately measure the interference between the first network entity 902 and second network entity 904.

Figure 10:
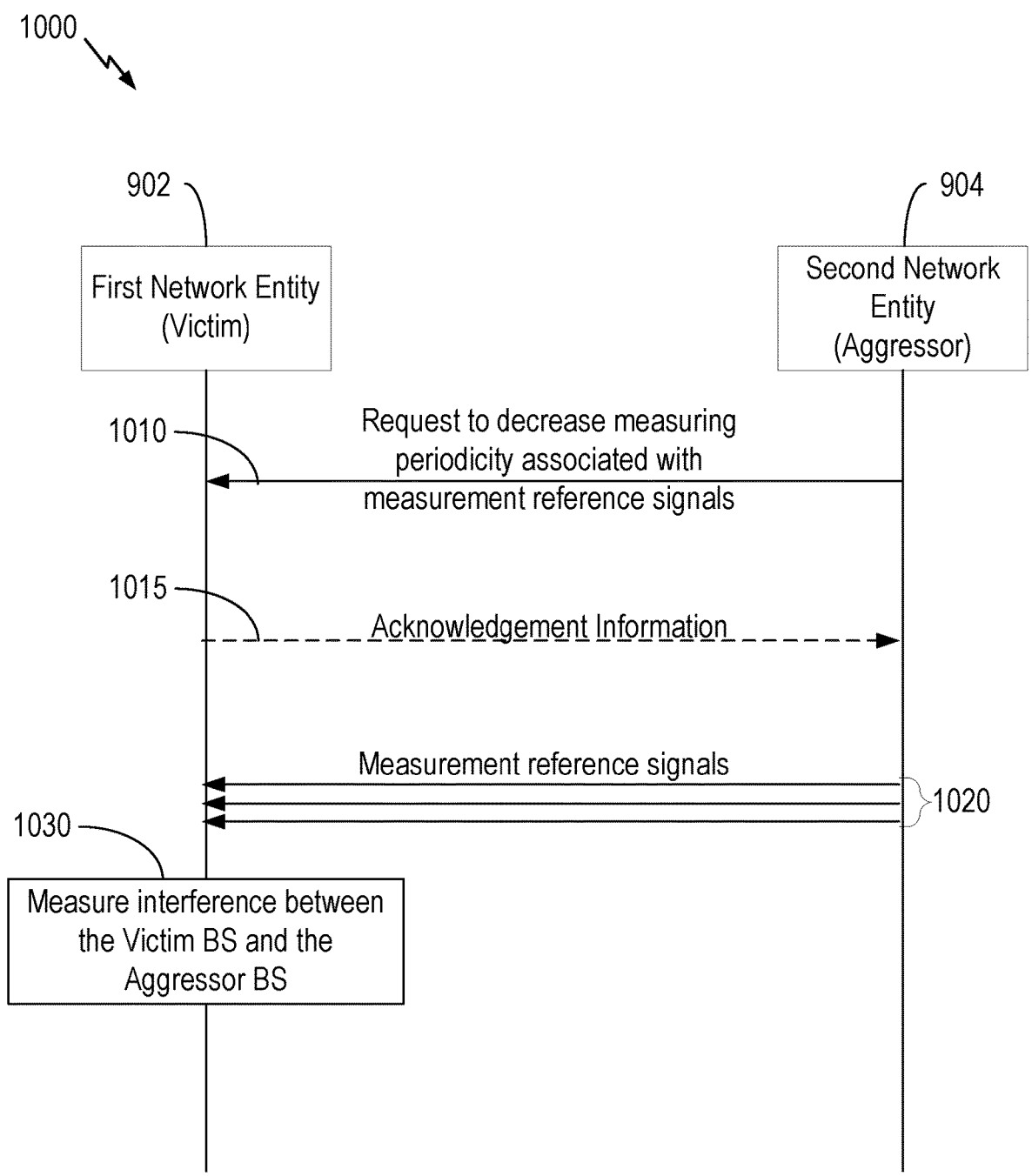
FIG. 10 depicts another process flow illustrating example operations for communication in a network between a first network entity and a second network entity.

Example Operations for Request-Based Interference Management Involving a High Mobility Aggressor Network Entity and a Stationary or Low Mobility Victim Network Entity FIG. 10 depicts a process flow illustrating example operations 1000 for communication in a network between the first network entity 902 and the second network entity 904 as first described with respect to FIG. 9. In some cases, the operations 1000 may be applicable to wireless communication environments, such as the wireless communication environment 900 in which the first network entity 902 comprises a stationary or low mobility victim network entity and the second network entity 904 comprises a high mobility aggressor network entity.

Operations 1000 may begin with the first network entity 902 and second network entity 904 communicating a message including a request related to transmission of one or more measurement RSs for measuring interference between the first network entity 902 and the second network entity 904. For example, as shown at step 1010, the second network entity 904 transmits a message to the first network entity 902 including a request to decrease a measuring periodicity associated with the one or more measurement reference signals from a first measuring periodicity (e.g., N hundreds of milliseconds) to a second measuring periodicity (e.g., approximately 5-10 milliseconds) that is shorter than the first measuring periodicity.

In some cases, the second measuring periodicity may be based on a velocity of the second network entity 904. For example, the second network entity 904 may estimate its velocity and select a measuring periodicity that is sufficient for accurate interference measurement for the estimated velocity. The second network entity 904 may then transmit an indication of the second measuring periodicity to the first network entity 902, for example, in the message transmitted at 1010 in FIG. 10. In some cases, the indication of the second measuring periodicity may comprise an indication of the actual second measuring periodicity to use or may include an offset that the first network entity 902 may apply to the first measuring periodicity to derive the second measuring periodicity. In other cases, in response to receiving the request to decrease the measuring periodicity, the first network entity 902 may estimate the velocity of the second network entity 904 and select the second measuring periodicity based on the estimated velocity of the second network entity 904.

In some cases, the first network entity 902 may optionally transmit acknowledgement information to the second network entity 904 in step 1015 based on the request received in the message in step 1010. For example, the first network entity 902 may transmit positive acknowledgement information in step 1015, indicating to the second network entity 904 that the first network entity 902 will comply with the request received in step 1010 and will decrease the measuring periodicity associated with the one or more measurement reference signals. In other cases, the first network entity 902 may transmit negative acknowledgement information in step 1015, indicating to the second network entity 904 that the first network entity 902 will not comply with the request received in step 1010 and will not decrease the measuring periodicity associated with the one or more measurement reference signals.

Thereafter, as shown in step 1020 in FIG. 10, in response to transmitting the request (and, in some cases, receiving positive acknowledgement information), the second network entity 904 transmits the one or more measurement RSs based on the second measuring periodicity (e.g., according to a corresponding transmission periodicity). Additionally, in response to receiving the request to decrease the measuring periodicity, the first network entity 902 monitors for and receives the one or more measurement RSs from the second network entity 904 according to the second measuring periodicity. Thereafter, as shown at 1030, the first network entity 902 measures the interference between the first network entity 902 and the second network entity 904 based on the one or more measurement RSs received from the second network entity 904. The first network entity 902 and second network entity 904 may then negotiate/coordinate scheduling, based on the interference measurements, to reduce or manage interference between the first network entity 902 and the second network entity 904.

In some cases, the message including the request transmitted by the second network entity 904 at step 1010 in FIG. 10 may comprise different types of messages, such an explicit message or an implicit message. For example, in some cases, the second network entity 904 may transmit an explicit message to the first network entity 902 that directly or explicitly indicates the request to decrease the measuring periodicity. In some cases, the second network entity 904 may transmit this explicit message via over-the-air (OTA) signaling or via a backhaul link between the first network entity 902 and the second network entity 904.

In some cases, when OTA signaling is used to transmit the explicit message, the OTA may be exchanged directly from one distributed unit (DU) to another DU. For example, in some cases, the first network entity 902 may comprise a first DU and the second network entity 904 may comprise a second DU. In some cases, the first DU and second DU may be part of the same BS or may be part of separate BSs.

In some cases, the OTA signaling used to transmit the explicit message from the second network entity 904 to the first network entity 902 may comprise a predefined reference sequence, such as a new type of RS. In other cases, the OTA signaling may comprise physical uplink control channel (PUCCH) signaling or physical downlink control channel (PDCCH) signaling that may be periodically monitored by network entities, such as the first network entity 902 and the second network entity 904. In this case, either the first network entity 902 or the second network entity 904 may need to have a collocated mobile termination (MT) component or a user equipment (UE). In some cases, the OTA signaling may comprise physical sidelink shared channel (PSSCH) signaling, assuming that both the first network entity 902 and the second network entity 904 are capable of exchanging sidelink signaling.

As noted above, in some cases, the explicit message may be transmitted and received via a backhaul link between the first network entity 902 and the second network entity 904. The explicit message may be transmitted by the second network entity 904 via the backhaul link in different manners depending on whether the first network entity 902 and second network entity 904 are part of the same BS or different BSs.

For example, in some cases, the first network entity 902 comprises a first DU of a BS and the second network entity 904 comprises a second DU of the BS. In such cases, the explicit message may be received via the backhaul link at the first DU from second DU via a centralized unit (CU) of the BS. Stated otherwise, the explicit message may be transmitted via the backhaul link from the second DU to the first DU via the CU of the BS. For example, the second DU may send the explicit message to the CU of the BS and the CU may forward the explicit message to the first DU.

In other cases, the first network entity 902 comprises a first DU of a first BS and the second network entity 904 comprises a second DU of a second BS. In such cases, the explicit message may be received via the backhaul link at the first DU from the second DU via a first CU of the first BS and a second CU of the second BS. Stated otherwise, the explicit message may be transmitted via the backhaul link from the second DU to the first DU via the second CU of the second BS and the first CU of the first BS. For example, the second DU may send the explicit message to the second CU of the second BS. The second CU may then forward the explicit message to the first CU of the first BS, which, in turn, may forward the explicit message to the first DU.

In some cases, as noted above, rather than transmitting an explicit message including the request to decrease the measuring periodicity, the message may comprise an implicit message. In some cases, the implicit indication may be provided by the second network entity 904 to the first network entity 902 via mobile node discovery detection. For example, in some cases, high mobility network entities, such as the second network entity 904, may have unique cell IDs or may transmit their signals in certain unique time frequency resources. In such cases, other network entities, such as the first network entity 902, may detect the presence of a high mobility network entity based on the unique cell IDs or signals transmitted in the unique time and frequency resources. When the presence of a high mobility network entity is detected by the first network entity 902, the first network entity 902 may autonomously switch from the first measuring periodicity to the second measuring periodicity, assuming, by default (e.g., based on a pre-configured rule), that the second network entity 904 will be transmitting the one or more RSs according to a transmission periodicity corresponding to the second measuring periodicity.

In another example, for mobile node discovery, mobile network entities, such as the second network entity 904, may act as a MT or UE and may monitor for stationary network entities, such as the first network entity 902. In such cases, when the second network entity 904 detects the first network entity 902, an extended random access procedure (RACH) procedure may be used by the second network entity 904 to implicitly indicate the request to decrease the measuring periodicity. For example, in some cases, the second network entity 904 may transmit a RACH message to the first network entity 902 and the RACH message may implicitly indicate to the first network entity 902 to reduce the measuring periodicity.

Further, while configured to monitoring for and measure the one or more measurement RSs according to the second measuring periodicity, the (stationary/low mobility) first network entity 902 may also monitor the presence of the (high mobility) second network entity 904 within the wireless communications environment 900. In some cases, when the first network entity 902 detects that the second network entity 904 has moved sufficiently far away to no longer significantly interfere with transmissions by or to the first network entity 902, the first network entity 902 may resume using the first measuring periodicity to less frequently monitor for and measure measurement RSs.

Figure 11:
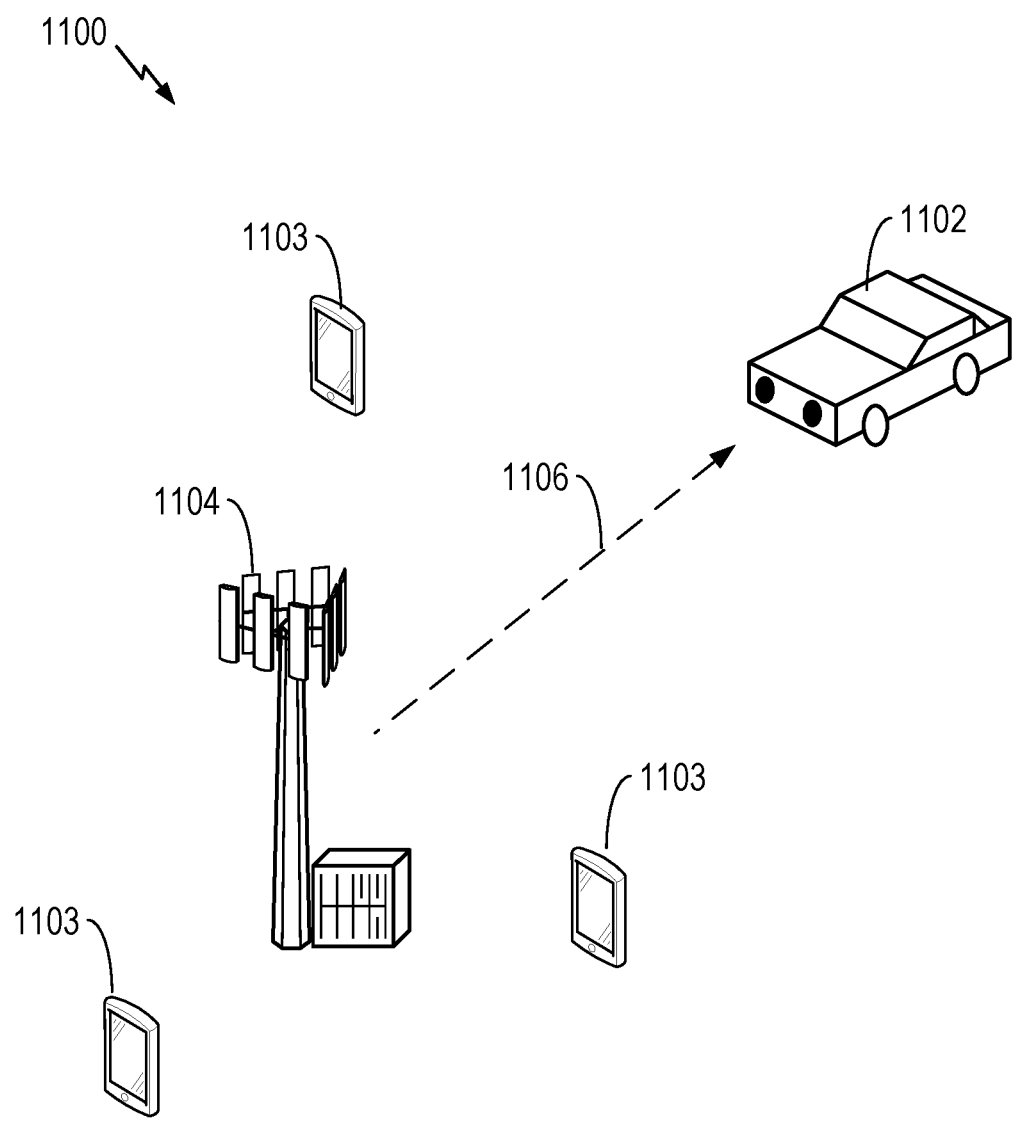
FIG. 11 illustrates another wireless communications environment that includes a first network entity and a second network entity.

Aspects Related to Interference Management Involving a High Mobility Victim Network Entity and a Stationary or Low Mobility Aggressor Network Entity FIG. 11 illustrates a scenario in which a high mobility network entity comprises a victim network entity and a stationary or low mobility network entity comprises an aggressor network entity.

In particular, FIG. 11 illustrates a wireless communications environment 1100 that includes a first network entity 1102 and a second network entity 1104. In some aspects, the first network entity 1102 and second network entity 1104 may be examples of the BS 102 depicted and described with respect to FIGS. 1 and 2 or one or more components of the BS 102, such as a DU. In some aspects, the first network entity 1102 and second network entity 1104 may be examples of an IAB node, such as one of the IAB nodes 510 illustrated in FIG. 5.

In some cases, the first network entity 1102 may have high mobility (e.g., velocity greater than or equal to a threshold) while the second network entity 1104 may be stationary or low mobility. Due to the high mobility of the first network entity 1102, the first network entity 1102 may be capable of unpredictably moving to different locations within the wireless communications environment 1100, which may cause interference between the first network entity 1102 and the second network entity 1104 as shown at 1106 in FIG. 11. For example, as shown in FIG. 11, the second network entity 1104 may cause interference to transmissions by or to the first network entity 1102 associated with UEs 1103 served by the first network entity 1102. As a result, in this scenario, the (stationary or low mobility) second network entity 1104 may be considered an aggressor network entity while the (high mobility) first network entity 1102 may be considered a victim network entity.

As noted above, the high mobility of the first network entity 1102 may cause issues with interference measurements performed by the (high mobility) first network entity 1102. For example, as noted above, interference measurements may be performed by victim network entities (e.g., the first network entity 1102 in this case) for various TX/RX beam pairs between an aggressor network entity (e.g., the second network entity 1104 in this case) and the victim network entity. However, these TX/RX beam pairs used to perform the interference measurements may be spatially related and depend on the geographical locations of the aggressor network entity and victim network entity.

Due to the dependence of TX/RX beam pairs on the geographical locations of the first network entity 1102 and the second network entity 1104, when the (high mobility) first network entity 1102 moves locations relative to the (stationary/low mobility) second network entity 1104, the TX/RX beam pairs and associated interference measurements between the first network entity 1102 and the second network entity 1104 may no longer be accurate and may need to be updated. However, due to the velocity of the (victim) first network entity 1102, any updated interference measurements performed by the (victim) first network entity 1102 may quickly become outdated. Moreover, given the long/infrequent transmission periodicity of the measurement RSs by the (aggressor) second network entity 1104, the first network entity 1102 may not be able to quickly update these outdated and inaccurate interference measurements.

To help resolve these issues, in some cases, rather than transmitting measurement RSs at a long periodicity (e.g., infrequently), the (victim/high mobility) first network entity 1102 may instead decide to transmit a message to the (aggressor/low mobility) second network entity 1104 to transmit the measurement RSs using a shorter transmission periodicity (e.g. more frequently). Transmitting the measurement RSs more frequently may allow for more accurate interference measurements by the first network entity 1102.

Figure 12:
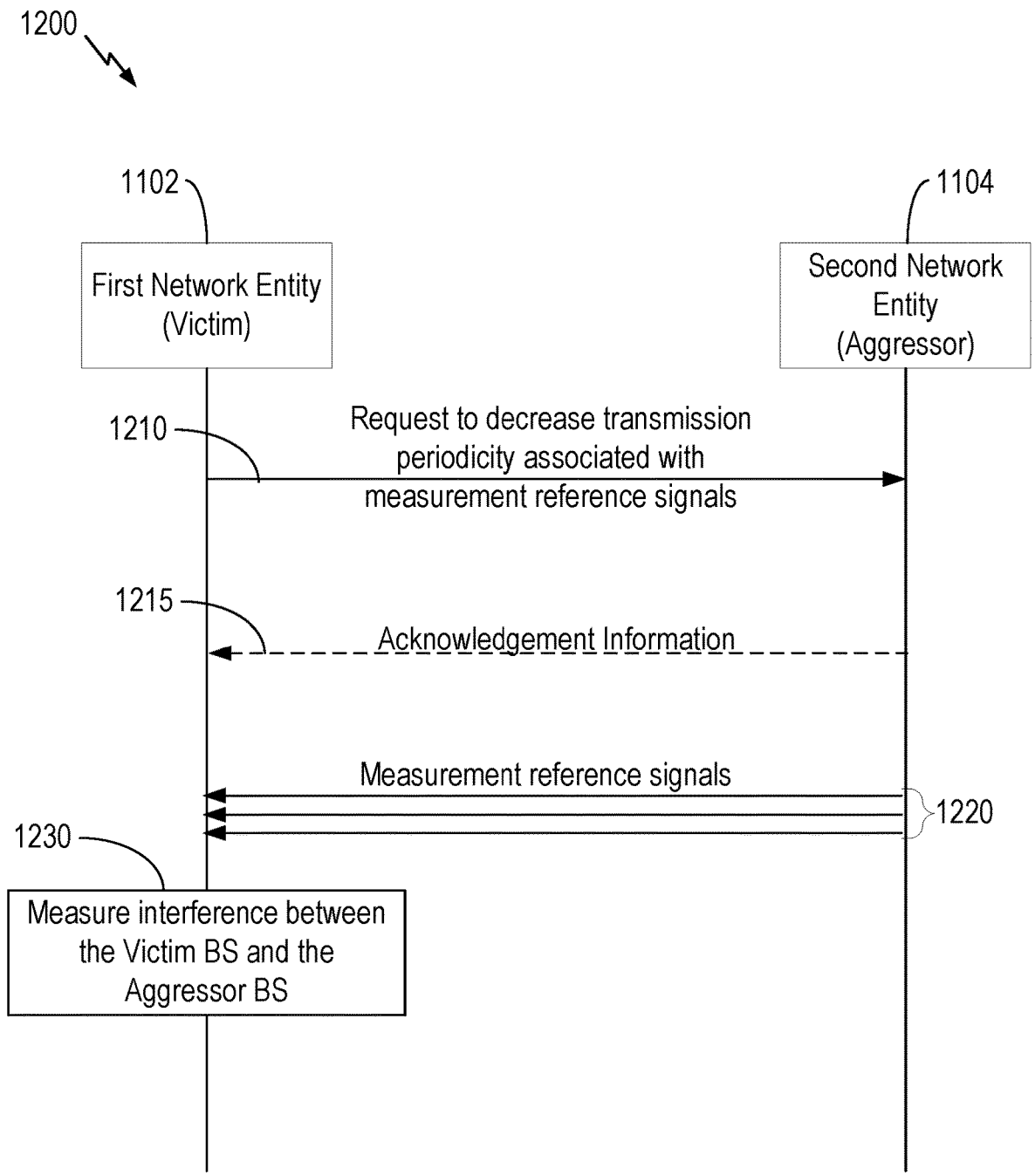
FIG. 12 depicts another process flow illustrating example operations for communication in a network between a first network entity and a second network entity

Example Operations for Request-Based Interference Management Involving a High Mobility Victim Network Entity and a Stationary or Low Mobility Aggressor Network Entity FIG. 12 depicts a process flow illustrating example operations 1200 for communication in a network between the first network entity 1102 and the second network entity 1104 as first described with respect to FIG. 11. In some cases, the operations 1200 may be applicable to wireless communication environments, such as the wireless communication environment 1100 in which the first network entity 1102 comprises a high mobility victim network entity and the second network entity 1104 comprises a stationary or low mobility aggressor network entity.

Operations 1200 may begin with the first network entity 1102 and second network entity 1104 communicating a message including a request related to transmission of one or more measurement RSs for measuring interference between the first network entity 1102 and the second network entity 1104. For example, as shown at step 1210, the first network entity 1102 transmits a message to the second network entity 1104 including a request to decrease a transmission periodicity associated with transmitting the one or more measurement RSs from a first transmission periodicity (e.g., N hundreds of milliseconds) to a second transmission periodicity (e.g., approximately 5-10 milliseconds) that is shorter than the first transmission periodicity.

In some cases, the second transmission periodicity may be based on a velocity of the first network entity 1102. For example, the first network entity 1102 may estimate its velocity and select a transmission periodicity that is sufficient for accurate interference measurement for the estimated velocity. The first network entity 1102 may then transmit an indication of the second transmission periodicity to the second network entity 1104, for example, in the message transmitted at 1210 in FIG. 12. In some cases, the indication of the second transmission periodicity may comprise an indication of the actual second transmission periodicity to use or may include an offset that the second network entity 1104 may apply to the first transmission periodicity to derive the second transmission periodicity. In other cases, in response to receiving the request to decrease the transmission periodicity, the second network entity 1104 may estimate the velocity of the first network entity 1102 and select the second transmission periodicity based on the estimated velocity of the first network entity 1102.

In some cases, the second network entity 1104 may optionally transmit acknowledgement information to the first network entity 1102 in step 1215 based on the request received in the message in step 1210. For example, the second network entity 1104 may transmit positive acknowledgement information in step 1215, indicating to the first network entity 1102 that the second network entity 1104 will comply with the request received in step 1210 and will decrease the transmission periodicity associated with transmitting the one or more measurement RSs. In other cases, the second network entity 1104 may transmit negative acknowledgement information in step 1215, indicating to the first network entity 1102 that the second network entity 1104 will not comply with the request received in step 1210 and will not decrease the transmission periodicity associated with transmitting the one or more measurement RSs.

Thereafter, as shown in step 1220 in FIG. 12, in response to receiving the request (and, in some cases, transmitting positive acknowledgement information), the second network entity 1104 transmits the one or more measurement RSs based on the second transmission periodicity. Additionally, in response to transmitting the request to decrease the transmission periodicity, the first network entity 1102 monitors for and receives the one or more measurement RSs from the second network entity 1104 based on the second transmission periodicity (e.g., according to a corresponding measuring periodicity). Thereafter, as shown at 1230, the first network entity 1102 measures the interference between the first network entity 1102 and the second network entity 1104 based on the one or more measurement RSs received from the second network entity 1104. The first network entity 1102 and second network entity 1104 may then negotiate/coordinate scheduling, based on the interference measurements, to reduce or manage interference between the first network entity 1102 and the second network entity 1104.

In some cases, the message including the request transmitted by the first network entity 1102 at step 1210 in FIG. 12 may comprise different types of messages, such an explicit message or an implicit message. For example, in some cases, the first network entity 1102 may transmit an explicit message to the second network entity 1104 that directly or explicitly indicates the request to decrease the transmission periodicity. In some cases, the first network entity 1102 may transmit this explicit message via OTA signaling or via a backhaul link between the first network entity 1102 and the second network entity 1104.

In some cases, when OTA signaling is used to transmit the explicit message, the OTA may be exchanged directly from one DU to another DU. For example, in some cases, the first network entity 1102 may comprise a first DU and the second network entity 1104 may comprise a second DU. In some cases, the first DU and second DU may be part of the same BS or may be part of separate BSs.

In some cases, the OTA signaling used to transmit the explicit message from the first network entity 1102 to the second network entity 1104 may comprise a predefined reference sequence, such as a new type of RS. In other cases, the OTA signaling may comprise PUCCH signaling or PDCCH signaling that may be periodically monitored by network entities, such as the first network entity 1102 and the second network entity 1104. In this case, either the first network entity 1102 or the second network entity 1104 may need to have a collocated MT component or UE. In some cases, the OTA signaling may comprise PSSCH signaling, assuming that both the first network entity 1102 and the second network entity 1104 are capable of exchanging sidelink signaling.

As noted above, in some cases, the explicit message may be transmitted and received via a backhaul link between the first network entity 1102 and the second network entity 1104. The explicit message may be transmitted by the first network entity 1102 via the backhaul link in different manners depending on whether the first network entity 1102 and second network entity 1104 are part of the same BS or different BSs.

For example, in some cases, the first network entity 1102 comprises a first DU of a BS and the second network entity 1104 comprises a second DU of the BS. In such cases, the explicit message may be received via the backhaul link at the second DU from first DU via a CU of the BS. Stated otherwise, the explicit message may be transmitted via the backhaul link from the first DU to the second DU via the CU of the BS. For example, the first DU may send the explicit message to the CU of the BS and the CU may forward the explicit message to the second DU.

In other cases, the first network entity 1102 comprises a first DU of a first BS and the second network entity 1104 comprises a second DU of a second BS. In such cases, the explicit message may be received via the backhaul link at the second DU from the first DU via a first CU of the first BS and a second CU of the second BS. Stated otherwise, the explicit message may be transmitted via the backhaul link from the first DU to the second DU via the first CU of the first BS and the second CU of the second BS. For example, the first DU may send the explicit message to the first CU of the first BS. The first CU may then forward the explicit message to the second CU of the second BS, which, in turn, may forward the explicit message to the second DU.

In some cases, as noted above, rather than transmitting an explicit message including the request to decrease the transmission periodicity, the message may comprise an implicit message. In some cases, the implicit indication may be provided by the first network entity 1102 to the second network entity 1104 via mobile node discovery detection. For example, in some cases, high mobility network entities, such as the first network entity 1102, may have unique cell IDs or may transmit their signals in certain unique time frequency resources. In such cases, other network entities, such as the second network entity 1104, may detect the presence of a high mobility network entity based on the unique cell IDs or signals transmitted in the unique time and frequency resources. When the presence of a high mobility network entity is detected by the second network entity 1104, the second network entity 1104 may autonomously switch from the first transmission periodicity to the second transmission periodicity, assuming, by default (e.g., based on a pre-configured rule), that the first network entity 1102 will be monitoring for and measuring the one or more RSs according to a measuring periodicity corresponding to the second transmission periodicity.

In another example, for mobile node discovery, mobile network entities, such as the first network entity 1102, may act as a MT or UE and may monitor for stationary network entities, such as the second network entity 1104. In such cases, when the first network entity 1102 detects the second network entity 1104, an extended RACH procedure may be used by the first network entity 1102 to implicitly indicate the request to decrease the transmission periodicity. For example, in some cases, the first network entity 1102 may transmit a RACH message to the second network entity 1104 and the RACH message may implicitly indicate to the second network entity 1104 to reduce the transmission periodicity.

Further, while configured to transmit the one or more measurement RSs according to the (more frequent) second transmission periodicity, the (stationary/low mobility) second network entity 1104 may also monitor the presence of the first network entity 1102 within the wireless communications environment 1100. In some cases, when the second network entity 1104 detects that the first network entity 1102 has moved sufficiently far away to no longer significantly interfere with transmissions by or to the second network entity 1104, the second network entity 1104 may resume using the first transmission periodicity to less frequently transmit measurement RSs.

Example Operations of a First Network Entity

Figure 13:
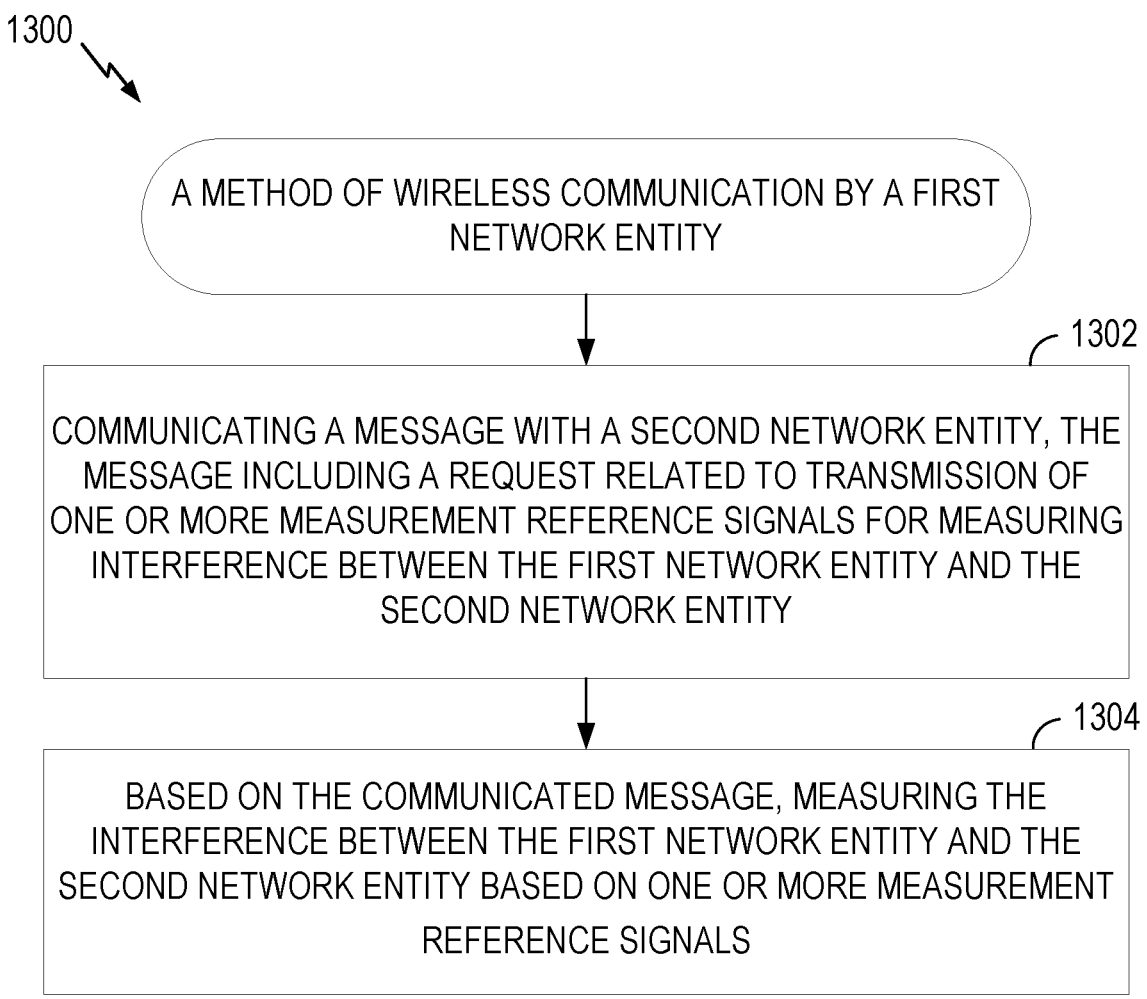
FIG. 13 depicts a method for wireless communication.
Figure 16:
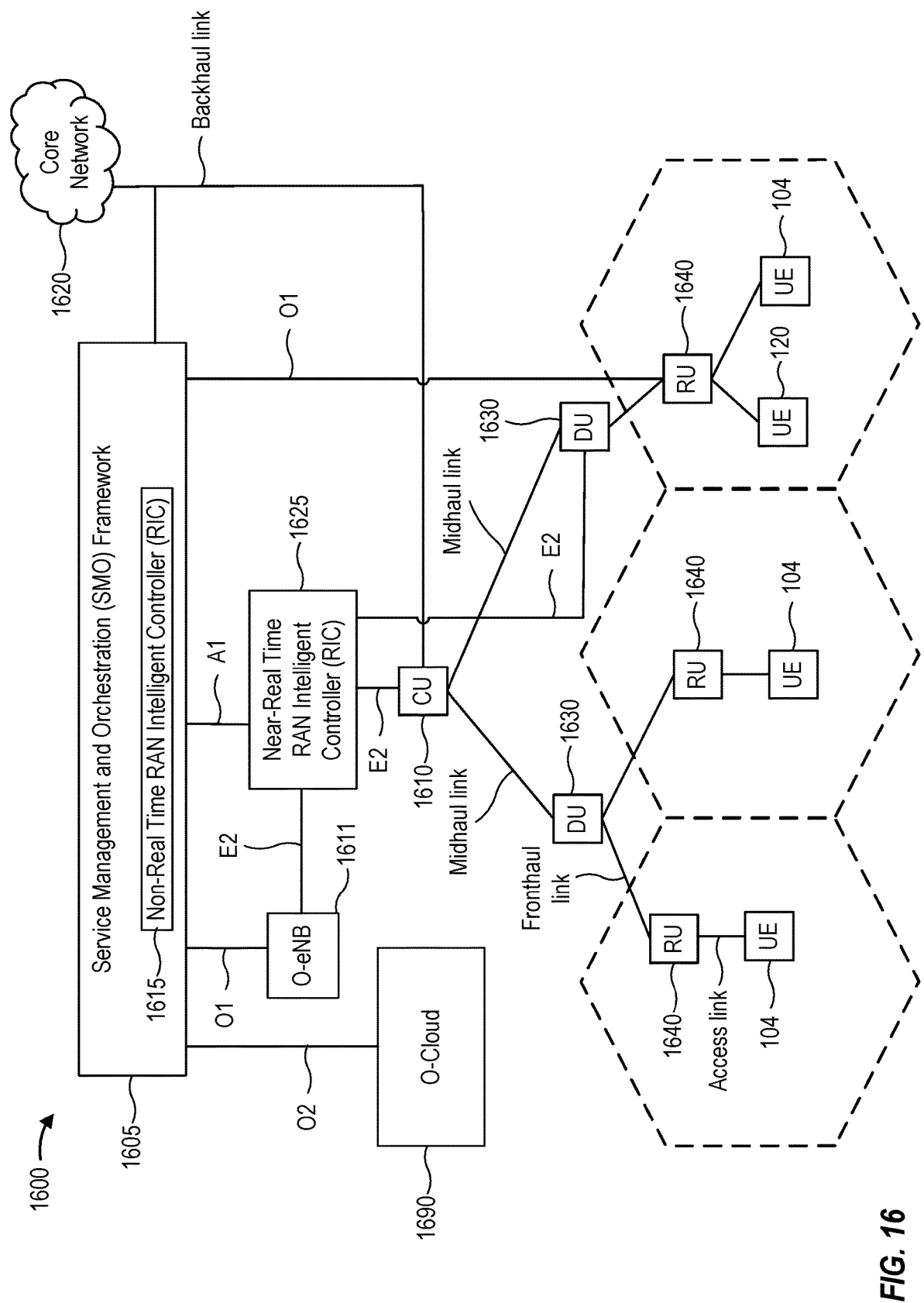
FIG. 16 depicts an example disaggregated base station architecture.

FIG. 13 shows a method 1300 for wireless communication by a first network entity, such as BS 102 of FIGS. 1 and 2, first network entity 802 of FIG. 8, the first network entity 902 of FIGS. 9 and 10, the first network entity of FIGS. 11 and 12, an IAB node as described with respect to FIG. 5, or a disaggregated base station as discussed with respect to FIG. 16. In some cases, the first network entity may comprise a victim network entity.

Method 1300 begins at 1302 with communicating a message with a second network entity, the message including a request related to transmission of one or more measurement reference signals for measuring interference between the first network entity and the second network entity. In some cases, the operations of this step refer to, or may be performed by, RS request circuitry as described with reference to FIG. 15.

Method 1300 then proceeds to step 1304 with, based on the communicated message, measuring the interference between the first network entity and the second network entity based on one or more measurement reference signals. In some cases, the operations of this step refer to, or may be performed by, RS measurement circuitry as described with reference to FIG. 15.

In one aspect, communicating the message with the second network entity comprises transmitting the message to the second network entity. In one aspect, the request in the message requests the second network entity to transmit the one or more measurement reference signals. In one aspect, measuring the interference comprises: receiving the one or more measurement reference signals from the second network entity, and measuring the interference between the first network entity and the second network entity based on the one or more measurement reference signals received from the second network entity. In one aspect, the first network entity comprises one of a first non-mobile BS or a first low mobility BS. In one aspect, the second network entity comprises a second non-mobile BS or a second low mobility BS.

In one aspect, communicating the message with the second network entity comprises receiving the message from the second network entity. In one aspect, the request in the message requests the first network entity to decrease a measuring periodicity associated with the one or more measurement reference signals from a first measuring periodicity to a second measuring periodicity that is shorter than the first measuring periodicity. In one aspect, measuring the interference comprises: receiving the one or more measurement reference signals from the second network entity according to the second measuring periodicity, and measuring the interference between the first network entity and the second network entity based on the one or more measurement reference signals received from the second network entity.

In one aspect, the first network entity comprises one of: a non-mobile or low mobility BS, or a non-mobile or low mobility IAB node. In one aspect, the second network entity comprises one of: high mobility BS or a high mobility IAB node.

In one aspect, the second measuring periodicity is based on a velocity of the second network entity.

In one aspect, receiving the message from the second network entity comprises receiving an explicit message via one of: OTA signaling, or a backhaul link between the first network entity and the second network entity.

In one aspect, the first network entity comprises a first DU of a BS, the second network entity comprises a second DU of the BS, and the explicit message is received via the backhaul link at the first DU from second DU via a CU of the BS.

In one aspect, the first network entity comprises a first DU of a first BS, the second network entity comprises a second DU of a second BS, and the explicit message is received via the backhaul link at the first DU from the second DU via a first CU of the first BS and a second CU of the second BS.

In one aspect, the explicit message is received via the OTA signaling. In one aspect, the OTA signaling comprises at least one of a predefined reference sequence, PUCCH signaling, or PSSCH signaling.

In one aspect, the message received from the second network entity comprises an implicit message that comprises at least one of a cell ID associated with the second network entity or a RACH message associated with the second network entity.

In one aspect, communicating the message with the second network entity comprises transmitting the message to the second network entity. In one aspect, the request in the message requests the second network entity to decrease a transmission periodicity associated with transmitting the one or more measurement reference signals from a first transmission periodicity to a second transmission periodicity that is shorter than the first transmission periodicity. In one aspect, measuring the interference comprises: receiving the one or more measurement reference signals from the second network entity according to the decreased transmission periodicity, and measuring the interference between the first network entity and the second network entity based on the one or more measurement reference signals received from the second network entity.

In one aspect, the first network entity comprises one of a high mobility BS or a high mobility IAB node. In one aspect, the second network entity comprises one of: a non-mobile or low mobility BS, or a non-mobile or low mobility IAB node.

In one aspect, the second transmission periodicity is based on a velocity of the first network entity.

In one aspect, transmitting the message to the second network entity comprises transmitting an explicit message via one of: OTA signaling, or a backhaul link between the first network entity and the second network entity.

In one aspect, the first network entity comprises a first DU of a BS, the second network entity comprises a second DU of the BS, and the explicit message is transmitted via the backhaul link from the first DU to the second DU via a CU of the BS.

In one aspect, the first network entity comprises a first DU of a first BS, the second network entity comprises a second DU of a second BS, and the explicit message is transmitted via the backhaul link from the first DU to the second DU via a first CU of the first BS and a second CU of the second BS.

In one aspect, the explicit message is transmitted via the OTA signaling. In one aspect, the OTA signaling comprises at least one of: a predefined reference sequence, PDCCH signaling, or PSSCH signaling.

In one aspect, the message transmitted to the second network entity comprises an implicit message that comprises at least one of cell ID associated with the first network entity or a RACH message associated with the first network entity.

Figure 15:
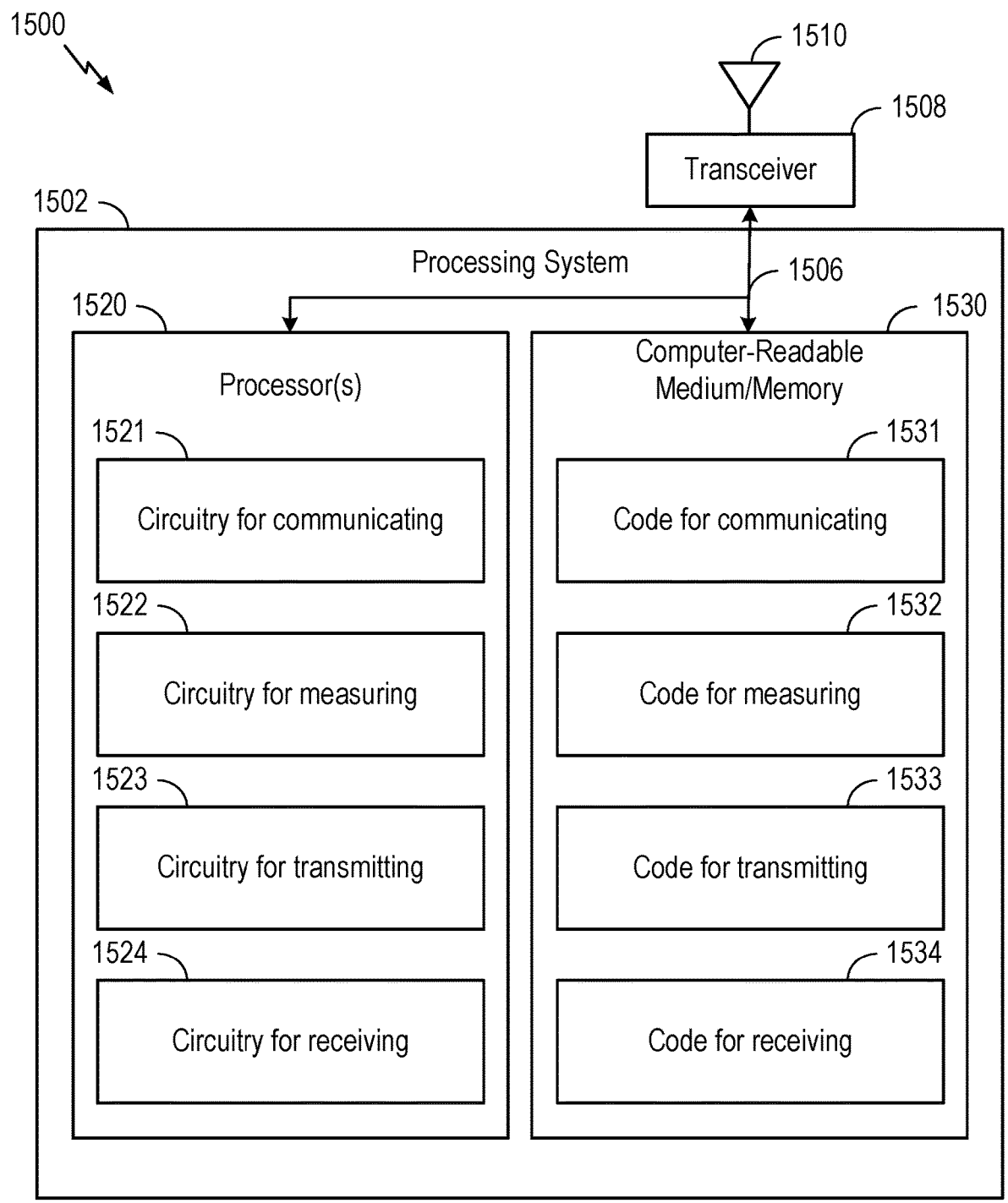
FIG. 15 depicts aspects of an example communications device.

In one aspect, method 1300, or any aspect related to it, may be performed by an apparatus, such as communications device 1500 of FIG. 15, which includes various components operable, configured, or adapted to perform the method 1300. Communications device 1500 is described below in further detail.

Note that FIG. 13 is just one example of a method, and other methods including fewer, additional, or alternative steps are possible consistent with this disclosure.

Example Operations of a Second Network Entity

Figure 14:
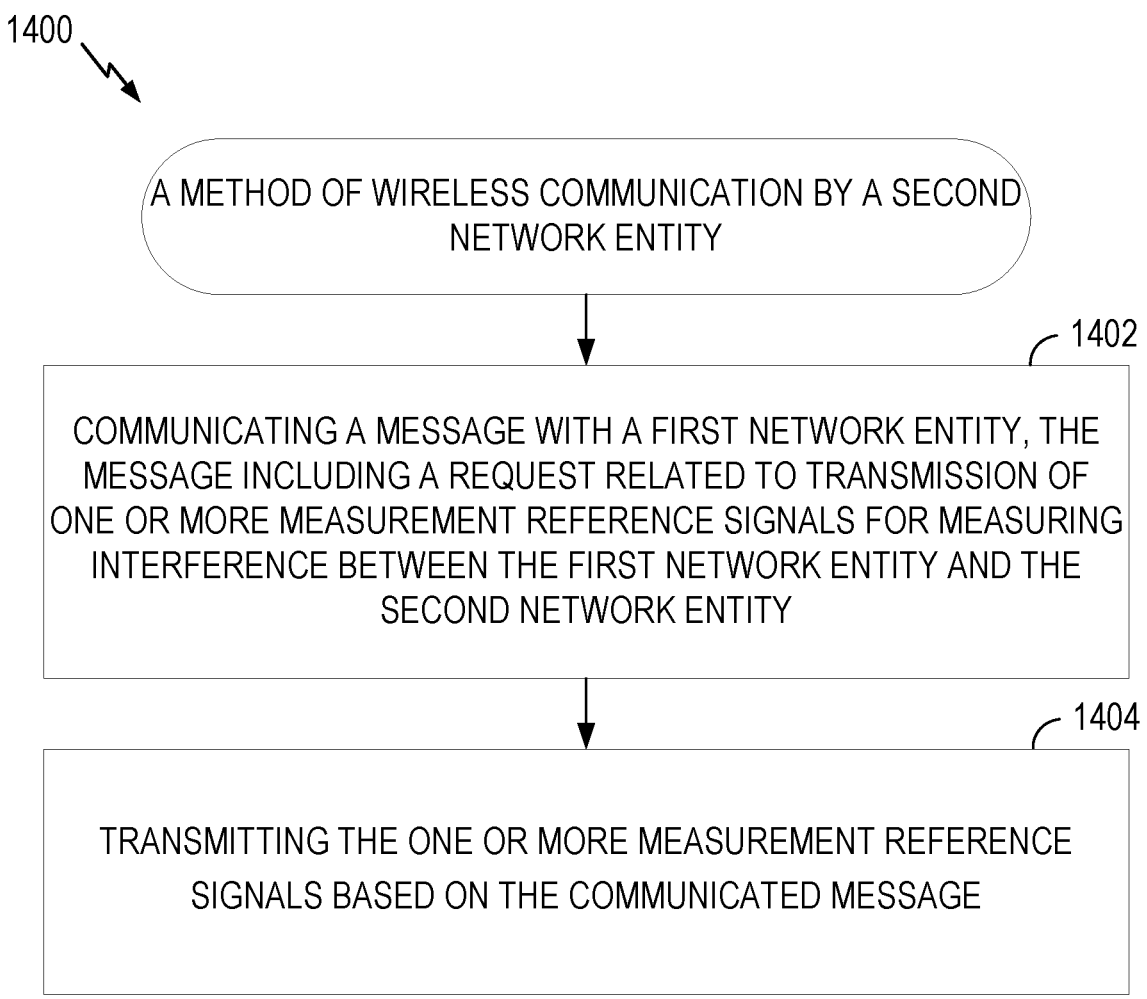
FIG. 14 depicts a method for wireless communication.

FIG. 14 shows a method 1400 for wireless communication by a second network entity, such as BS 102 of FIGS. 1 and 2, second network entity 804 of FIG. 8, the second network entity 904 of FIGS. 9 and 10, the second network entity of FIGS. 11 and 12, an IAB node as described with respect to FIG. 5, or a disaggregated base station as discussed with respect to FIG. 16. In some cases, the first network entity may comprise an aggressor network entity.

Method 1400 begins at 1402 with communicating a message with a first network entity, the message including a request related to transmission of one or more measurement reference signals for measuring interference between the first network entity and the second network entity. In some cases, the operations of this step refer to, or may be performed by, RS request circuitry as described with reference to FIG. 15.

Method 1400 then proceeds to step 1404 with transmitting the one or more measurement reference signals based on the communicated message. In some cases, the operations of this step refer to, or may be performed by, RS transmission circuitry as described with reference to FIG. 15.

In one aspect, communicating the message with the first network entity comprises receiving the message from the first network entity. In one aspect, the request in the message requests the second network entity to transmit the one or more measurement reference signals. In one aspect, the first network entity comprises one of a first non-mobile BS or a first low mobility BS. In one aspect, the second network entity comprises a second non-mobile BS or a second low mobility BS.

In one aspect, communicating the message with the first network entity comprises transmitting the message to the first network entity. In one aspect, the request in the message requests the first network entity to decrease a measuring periodicity associated with the one or more measurement reference signals from a first measuring periodicity to a second measuring periodicity that is shorter than the first measuring periodicity. In one aspect, transmitting the one or more measurement reference signals comprises transmitting the one or more measurement reference signals based on the second measuring periodicity.

In one aspect, the first network entity comprises one of: a non-mobile or low mobility BS, or a non-mobile or low mobility IAB node. In one aspect, the second network entity comprises one of high mobility BS or a high mobility IAB node.

In one aspect, the second measuring periodicity is based on a velocity of the second network entity.

In one aspect, transmitting the message to the first network entity comprises transmitting an explicit message via one of: OTA signaling, or a backhaul link between the first network entity and the second network entity.

In one aspect, the first network entity comprises a first DU of a BS, the second network entity comprises a second DU of the BS, and the explicit message is transmitted via the backhaul link from the second DU to the first DU via a CU of the BS.

In one aspect, the first network entity comprises a first DU of a first BS, the second network entity comprises a second DU of a second BS, and the explicit message is transmitted via the backhaul link from the second DU to the first DU via a first CU of the first BS and a second CU of the second BS.

In one aspect, the explicit message is transmitted via the OTA signaling. In one aspect, the OTA signaling comprises at least one of: a predefined reference sequence, PDCCH signaling, or PSSCH signaling.

In one aspect, the message transmitted to the first network entity comprises an implicit message that comprises at least one of a cell ID associated with the second network entity or a RACH message associated with the second network entity.

In one aspect, communicating the message with the first network entity comprises receiving the message from the first network entity. In one aspect, the request in the message requests the second network entity to decrease a transmission periodicity associated with transmitting the one or more measurement reference signals from a first transmission periodicity to a second transmission periodicity that is shorter than the first transmission periodicity. In one aspect, transmitting the one or more measurement reference signals comprises transmitting the one or more measurement reference signals to the first network entity according to the second transmission periodicity.

In one aspect, the first network entity comprises one of a high mobility BS or a high mobility IAB node. In one aspect, the second network entity comprises one of: a non-mobile or low mobility BS, or a non-mobile or low mobility IAB node.

In one aspect, the second transmission periodicity is based on a velocity of the first network entity.

In one aspect, receiving the message from the first network entity comprises receiving an explicit message via one of: OTA signaling, or a backhaul link between the first network entity and the second network entity.

In one aspect, the first network entity comprises a first DU of a BS, the second network entity comprises a second DU of the BS, and the explicit message is received via the backhaul link at the second DU from the first DU via a CU of the BS.

In one aspect, the first network entity comprises a first DU of a first BS, the second network entity comprises a second DU of a second BS, and the explicit message is received via the backhaul link at the second DU from the first DU via a first CU of the first BS and a second CU of the second BS.

In one aspect, the explicit message is received via the OTA signaling. In one aspect, the OTA signaling comprises at least one of: a predefined reference sequence, PUCCH signaling, or PSSCH signaling.

In one aspect, the message received from the second network entity comprises an implicit message that comprises at least one of a cell ID associated with the first network entity or a RACH message associated with the first network entity.

In one aspect, method 1400, or any aspect related to it, may be performed by an apparatus, such as communications device 1500 of FIG. 15, which includes various components operable, configured, or adapted to perform the method 1400. Communications device 1500 is described below in further detail.

Note that FIG. 14 is just one example of a method, and other methods including fewer, additional, or alternative steps are possible consistent with this disclosure.

Example Communication Devices

FIG. 15 depicts aspects of an example communications device 1500. In some cases, the communications device 1500 may include a first network entity, such as BS 102 of FIGS. 1 and 2, first network entity 802 of FIG. 8, the first network entity 902 of FIGS. 9 and 10, and/or the first network entity of FIGS. 11 and 12. In other cases, the communications device 1500 may include a second network entity, such as BS 102 of FIGS. 1 and 2, second network entity 804 of FIG. 8, the second network entity 904 of FIGS. 9 and 10, and/or the second network entity of FIGS. 11 and 12.

The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes one or more processors 1520. In various aspects, one or more processors 1520 may be representative of one or more of receive processor 238, transmit processor 220, TX MIMO processor 230, and/or controller/processor 240, as described with respect to FIG. 2. The one or more processors 1520 are coupled to a computer-readable medium/memory 1530 via a bus 1506. In certain aspects, the computer-readable medium/memory 1530 is configured to store instructions (e.g., computer-executable code) that when executed by the one or more processors 1520, cause the one or more processors 1520 to perform the operations illustrated in one or more of FIGS. 8, 10, and 12, as well as the method 1300 and method 1400 described with respect to FIGS. 13 and 14, respectively, or any aspect related to them. Note that reference to a processor of communications device 1500 performing a function may include one or more processors of communications device 1500 performing that function.

In the depicted example, the computer-readable medium/memory 1530 stores code (e.g., executable instructions) for communicating 1531, code for measuring 1532, code for transmitting 1533, and code for receiving 1534. Processing of the code 1531-1534 may cause the communications device 1500 to perform the operations illustrated in one or more of FIGS. 8, 10, and 12, as well as the method 1300 and method 1400 described with respect to FIGS. 13 and 14, respectively, or any aspect related to them.

The one or more processors 1520 include circuitry configured to implement (e.g., execute) the code stored in the computer-readable medium/memory 1530, including circuitry for communicating 1521, circuitry for measuring 1522, circuitry for transmitting 1523, and circuitry for receiving 1524. Processing with circuitry 1521-1524 may cause the communications device 1500 to perform the operations illustrated in one or more of FIGS. 8, 10, and 12, as well as the method 1300 and method 1400 described with respect to FIGS. 13 and 14, respectively, or any aspect related to them.

Various components of the communications device 1500 may provide means for performing the operations illustrated in one or more of FIGS. 8, 10, and 12, as well as the method 1300 and method 1400 described with respect to FIGS. 13 and 14, respectively, or any aspect related to them. Means for transmitting, communicating, sending, or outputting for transmission may include the transceivers 232 and/or antenna(s) 234 of the BS 102 illustrated in FIG. 2 and/or transceiver 1508 and antenna 1510 of the communications device 1500 in FIG. 15. Means for receiving, communicating, or obtaining may include the transceivers 232 and/or antenna(s) 234 of the BS 102 illustrated in FIG. 2 and/or transceiver 1508 and antenna 1510 of the communications device 1500 in FIG. 15.

Example Clauses

Implementation examples are described in the following numbered clauses:

Clause 1: A method for wireless communication by a first network entity, the method comprising: communicating a message with a second network entity, the message including a request related to transmission of one or more measurement reference signals for measuring interference between the first network entity and the second network entity; and based on the communicated message, measuring the interference between the first network entity and the second network entity based on one or more measurement reference signals.

Clause 2: The method of Clause 1, wherein: communicating the message with the second network entity comprises transmitting the message to the second network entity, the request in the message requests the second network entity to transmit the one or more measurement reference signals, and measuring the interference comprises: receiving the one or more measurement reference signals from the second network entity, and measuring the interference between the first network entity and the second network entity based on the one or more measurement reference signals received from the second network entity.

Clause 3: The method of Clause 2, wherein: the first network entity comprises one of a first non-mobile BS or a first low mobility BS, and the second network entity comprises a second non-mobile BS or a second low mobility BS.

Clause 4: The method of any one of Clauses 1-3, wherein: communicating the message with the second network entity comprises receiving the message from the second network entity, the request in the message requests the first network entity to decrease a measuring periodicity associated with the one or more measurement reference signals from a first measuring periodicity to a second measuring periodicity that is shorter than the first measuring periodicity, and measuring the interference comprises: receiving the one or more measurement reference signals from the second network entity according to the second measuring periodicity, and measuring the interference between the first network entity and the second network entity based on the one or more measurement reference signals received from the second network entity.

Clause 5: The method of Clause 4, wherein: the first network entity comprises one of: a non-mobile or low mobility BS, or a non-mobile or low mobility IAB node, and the second network entity comprises one of: high mobility BS or a high mobility IAB node.

Clause 6: The method of Clause 4, wherein: the second measuring periodicity is based on a velocity of the second network entity.

Clause 7: The method of Clause 4, wherein: receiving the message from the second network entity comprises receiving an explicit message via one of: OTA signaling, or a backhaul link between the first network entity and the second network entity.

Clause 8: The method of Clause 7, wherein: the first network entity comprises a first DU of a BS, the second network entity comprises a second DU of the BS, and the explicit message is received via the backhaul link at the first DU from second DU via a CU of the BS.

Clause 9: The method of Clause 7, wherein: the first network entity comprises a first DU of a first BS, the second network entity comprises a second DU of a second BS, and the explicit message is received via the backhaul link at the first DU from the second DU via a first CU of the first BS and a second CU of the second BS.

Clause 10: The method of Clause 7, wherein: the explicit message is received via the OTA signaling, and the OTA signaling comprises at least one of a predefined reference sequence, PUCCH signaling, or PSSCH signaling.

Clause 11: The method of Clause 4, wherein: the message received from the second network entity comprises an implicit message that comprises at least one of a cell ID associated with the second network entity or a RACH message associated with the second network entity.

Clause 12: The method of any one of Clauses 1-11, wherein: communicating the message with the second network entity comprises transmitting the message to the second network entity, the request in the message requests the second network entity to decrease a transmission periodicity associated with transmitting the one or more measurement reference signals from a first transmission periodicity to a second transmission periodicity that is shorter than the first transmission periodicity, and measuring the interference comprises: receiving the one or more measurement reference signals from the second network entity according to the decreased transmission periodicity, and measuring the interference between the first network entity and the second network entity based on the one or more measurement reference signals received from the second network entity.

Clause 13: The method of Clause 12, wherein: the first network entity comprises one of a high mobility BS or a high mobility IAB node, and the second network entity comprises one of: a non-mobile or low mobility BS, or a non-mobile or low mobility IAB node.

Clause 14: The method of Clause 12, wherein: the second transmission periodicity is based on a velocity of the first network entity.

Clause 15: The method of Clause 12, wherein: transmitting the message to the second network entity comprises transmitting an explicit message via one of: OTA signaling, or a backhaul link between the first network entity and the second network entity.

Clause 16: The method of Clause 15, wherein: the first network entity comprises a first DU of a BS, the second network entity comprises a second DU of the BS, and the explicit message is transmitted via the backhaul link from the first DU to the second DU via a CU of the BS.

Clause 17: The method of Clause 15, wherein: the first network entity comprises a first DU of a first BS, the second network entity comprises a second DU of a second BS, and the explicit message is transmitted via the backhaul link from the first DU to the second DU via a first CU of the first BS and a second CU of the second BS.

Clause 18: The method of Clause 15, wherein: the explicit message is transmitted via the OTA signaling, and the OTA signaling comprises at least one of: a predefined reference sequence, PDCCH signaling, or PSSCH signaling.

Clause 19: The method of Clause 12, wherein: the message transmitted to the second network entity comprises an implicit message that comprises at least one of cell ID associated with the first network entity or a RACH message associated with the first network entity.

Clause 20: A method for wireless communication by a second network entity, the method comprising: communicating a message with a first network entity, the message including a request related to transmission of one or more measurement reference signals for measuring interference between the first network entity and the second network entity; and transmitting the one or more measurement reference signals based on the communicated message.

Clause 21: The method of Clause 20, wherein: communicating the message with the first network entity comprises receiving the message from the first network entity, and the request in the message requests the second network entity to transmit the one or more measurement reference signals.

Clause 22: The method of Clause 21, wherein: the first network entity comprises one of a first non-mobile BS or a first low mobility BS, and the second network entity comprises a second non-mobile BS or a second low mobility BS.

Clause 23: The method of any one of Clauses 20-22, wherein: communicating the message with the first network entity comprises transmitting the message to the first network entity, the request in the message requests the first network entity to decrease a measuring periodicity associated with the one or more measurement reference signals from a first measuring periodicity to a second measuring periodicity that is shorter than the first measuring periodicity, and transmitting the one or more measurement reference signals comprises transmitting the one or more measurement reference signals based on the second measuring periodicity.

Clause 24: The method of Clause 23, wherein: the first network entity comprises one of: a non-mobile or low mobility BS, or a non-mobile or low mobility IAB node, and the second network entity comprises one of high mobility BS or a high mobility IAB node.

Clause 25: The method of Clause 23, wherein: the second measuring periodicity is based on a velocity of the second network entity.

Clause 26: The method of Clause 23, wherein: transmitting the message to the first network entity comprises transmitting an explicit message via one of: OTA signaling, or a backhaul link between the first network entity and the second network entity.

Clause 27: The method of Clause 26, wherein: the first network entity comprises a first DU of a BS, the second network entity comprises a second DU of the BS, and the explicit message is transmitted via the backhaul link from the second DU to the first DU via a CU of the BS.

Clause 28: The method of Clause 26, wherein: the first network entity comprises a first DU of a first BS, the second network entity comprises a second DU of a second BS, and the explicit message is transmitted via the backhaul link from the second DU to the first DU via a first CU of the first BS and a second CU of the second BS.

Clause 29 The method of Clause 26, wherein: the explicit message is transmitted via the OTA signaling, and the OTA signaling comprises at least one of: a predefined reference sequence, PDCCH signaling, or PSSCH signaling.

Clause 30: The method of Clause 23, wherein: the message transmitted to the first network entity comprises an implicit message that comprises at least one of a cell ID associated with the second network entity or a RACH message associated with the second network entity.

Clause 31: The method of any one of Clauses 20-30, wherein: communicating the message with the first network entity comprises receiving the message from the first network entity, the request in the message requests the second network entity to decrease a transmission periodicity associated with transmitting the one or more measurement reference signals from a first transmission periodicity to a second transmission periodicity that is shorter than the first transmission periodicity, and transmitting the one or more measurement reference signals comprises transmitting the one or more measurement reference signals to the first network entity according to the second transmission periodicity.

Clause 32: The method of Clause 31, wherein: the first network entity comprises one of a high mobility BS or a high mobility IAB node, and the second network entity comprises one of: a non-mobile or low mobility BS, or a non-mobile or low mobility IAB node.

Clause 33: The method of Clause 31, wherein: the second transmission periodicity is based on a velocity of the first network entity.

Clause 34: The method of Clause 31, wherein: receiving the message from the first network entity comprises receiving an explicit message via one of: OTA signaling, or a backhaul link between the first network entity and the second network entity.

Clause 35: The method of Clause 34, wherein: the first network entity comprises a first DU of a BS, the second network entity comprises a second DU of the BS, and the explicit message is received via the backhaul link at the second DU from the first DU via a CU of the BS.

Clause 36: The method of Clause 34, wherein: the first network entity comprises a first DU of a first BS, the second network entity comprises a second DU of a second BS, and the explicit message is received via the backhaul link at the second DU from the first DU via a first CU of the first BS and a second CU of the second BS.

Clause 37: The method of Clause 34, wherein: the explicit message is received via the OTA signaling, and the OTA signaling comprises at least one of: a predefined reference sequence, PUCCH signaling, or PSSCH signaling.

Clause 38: The method of any one of Clauses 20-37, wherein: the message received from the second network entity comprises an implicit message that comprises at least one of a cell ID associated with the first network entity or a RACH message associated with the first network entity.

Clause 39: An apparatus, comprising: a memory comprising executable instructions; and a processor configured to execute the executable instructions and cause the apparatus to perform a method in accordance with any one of Clauses 1-38.

Clause 40: An apparatus, comprising means for performing a method in accordance with any one of Clauses 1-38.

Clause 41: A non-transitory computer-readable medium comprising executable instructions that, when executed by a processor of an apparatus, cause the apparatus to perform a method in accordance with any one of Clauses 1-38.

Clause 42: A computer program product embodied on a computer-readable storage medium comprising code for performing a method in accordance with any one of Clauses 1-38.

Additional Wireless Communication Network Considerations

The techniques and methods described herein may be used for various wireless communications networks. While aspects may be described herein using terminology commonly associated with 3G, 4G, and/or 5G wireless technologies, aspects of the present disclosure may likewise be applicable to other communication systems and standards not explicitly mentioned herein.

Returning to FIG. 1, various aspects of the present disclosure may be performed within the example wireless communication network 100.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

FIG. 1 depicts various example BSs 102, which may more generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and others. Each of BSs 102 may provide communication coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communication coverage for a macro cell (covering relatively large geographic area), a pico cell (covering relatively smaller geographic area, such as a sports stadium), a femto cell (relatively smaller geographic area (e.g., a home)), and/or other types of cells.

While BSs 102 are depicted in various aspects as unitary communication devices, BSs 102 may be implemented in various configurations. For example, one or more components of base station may be disaggregated, including a central unit (CU), one or more distributed units (DUs), one or more radio units (RUs), a radio unit (RU), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 16 depicts and describes an example disaggregated base station architecture.

Different BSs 102 within wireless communication network 100 may also be configured to support different radio access technologies, such as 3G, 4G, and 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communication network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communication links 120 between BSs 102 and, for example, UEs 104, may be through one or more carriers, which may have different bandwidths (e.g., 5, 10, 15, 20, 100, 400, and other MHz), and which may be aggregated in various aspects. Carriers may or may not be adjacent to each other. Allocation of carriers may be asymmetric with respect to DL and UL (e.g., more or fewer carriers may be allocated for DL than for UL).

Wireless communication network 100 further includes a Wi-Fi AP 150 in communication with Wi-Fi stations (STAs) 152 via communication links 154 in, for example, a 2.4 GHz and/or 5 GHz unlicensed frequency spectrum.

Certain UEs 104 may communicate with each other using device-to-device (D2D) communication link 158. D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172 in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, an integrated access and backhaul (IAB) node, a relay node, a sidelink node, to name a few examples.

As noted above, FIG. 16 depicts an example disaggregated base station 1600 architecture. The disaggregated base station 1600 architecture may include one or more central units (CUs) 1610 that can communicate directly with a core network 1620 via a backhaul link, or indirectly with the core network 1620 through one or more disaggregated base station units (such as a Near-Real Time (Near-RT) RAN Intelligent Controller (RIC) 1625 via an E2 link, or a Non-Real Time (Non-RT) RIC 1615 associated with a Service Management and Orchestration (SMO) Framework 1605, or both). A CU 1610 may communicate with one or more distributed units (DUs) 1630 via respective midhaul links, such as an F1 interface. The DUs 1630 may communicate with one or more radio units (RUs) 1640 via respective fronthaul links. The RUs 1640 may communicate with respective UEs 104 via one or more radio frequency (RF) access links. In some implementations, the UE 104 may be simultaneously served by multiple RUs 1640.

Each of the units, i.e., the CUs 1610, the DUs 1630, the RUs 1640, as well as the Near-RT RICs 1625, the Non-RT RICs 1615 and the SMO Framework 1605, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 1610 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1610. The CU 1610 may be configured to handle user plane functionality (i.e., Central Unit-User Plane (CU-UP)), control plane functionality (i.e., Central Unit-Control Plane (CU-CP)), or a combination thereof. In some implementations, the CU 1610 can be logically split into one or more CU-UP units and one or more CU-CP units. The CU-UP unit can communicate bidirectionally with the CU-CP unit via an interface, such as the E1 interface when implemented in an O-RAN configuration. The CU 1610 can be implemented to communicate with the DU 1630, as necessary, for network control and signaling.

The DU 1630 may correspond to a logical unit that includes one or more base station functions to control the operation of one or more RUs 1640. In some aspects, the DU 1630 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 1630 may further host one or more low PHY layers. Each layer (or module) can be implemented with an interface configured to communicate signals with other layers (and modules) hosted by the DU 1630, or with the control functions hosted by the CU 1610.

Lower-layer functionality can be implemented by one or more RUs 1640. In some deployments, an RU 1640, controlled by a DU 1630, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1640 can be implemented to handle over the air (OTA) communication with one or more UEs 104. In some implementations, real-time and non-real-time aspects of control and user plane communication with the RU(s) 1640 can be controlled by the corresponding DU 1630. In some scenarios, this configuration can enable the DU(s) 1630 and the CU 1610 to be implemented in a cloud-based RAN architecture, such as a vRAN architecture.

The SMO Framework 1605 may be configured to support RAN deployment and provisioning of non-virtualized and virtualized network elements. For non-virtualized network elements, the SMO Framework 1605 may be configured to support the deployment of dedicated physical resources for RAN coverage requirements which may be managed via an operations and maintenance interface (such as an O1 interface). For virtualized network elements, the SMO Framework 1605 may be configured to interact with a cloud computing platform (such as an open cloud (O-Cloud) 1690) to perform network element life cycle management (such as to instantiate virtualized network elements) via a cloud computing platform interface (such as an O2 interface). Such virtualized network elements can include, but are not limited to, CUs 1610, DUs 1630, RUs 1640 and Near-RT RICs 1625. In some implementations, the SMO Framework 1605 can communicate with a hardware aspect of a 4G RAN, such as an open eNB (O-eNB) 1611, via an O1 interface. Additionally, in some implementations, the SMO Framework 1605 can communicate directly with one or more RUs 1640 via an O1 interface. The SMO Framework 1605 also may include a Non-RT RIC 1615 configured to support functionality of the SMO Framework 1605.

The Non-RT RIC 1615 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1625. The Non-RT RIC 1615 may be coupled to or communicate with (such as via an A1 interface) the Near-RT RIC 1625. The Near-RT RIC 1625 may be configured to include a logical function that enables near-real-time control and optimization of RAN elements and resources via data collection and actions over an interface (such as via an E2 interface) connecting one or more CUs 1610, one or more DUs 1630, or both, as well as an O-eNB, with the Near-RT RIC 1625.

In some implementations, to generate AI/ML models to be deployed in the Near-RT RIC 1625, the Non-RT RIC 1615 may receive parameters or external enrichment information from external servers. Such information may be utilized by the Near-RT RIC 1625 and may be received at the SMO Framework 1605 or the Non-RT RIC 1615 from non-network data sources or from network functions. In some examples, the Non-RT RIC 1615 or the Near-RT RIC 1625 may be configured to tune RAN behavior or performance. For example, the Non-RT RIC 1615 may monitor long-term trends and patterns for performance and employ AI/ML models to perform corrective actions through the SMO Framework 1605 (such as reconfiguration via O1) or via creation of RAN management policies (such as A1 policies).

Returning to FIG. 2, various example components of a BS 102 and a UE 104 are depicted, which may be used to implement aspects of the present disclosure.

In regards to an example downlink transmission, BS 102 includes a transmit processor 220 that may receive data from a data source 212 and control information from a controller/processor 240. The control information may be for the physical broadcast channel (PBCH), physical control format indicator channel (PCFICH), physical HARQ indicator channel (PHICH), physical downlink control channel (PDCCH), group common PDCCH (GC PDCCH), and others. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

In order to receive the downlink transmission, UE 104 includes antennas 252*a*-252*r* that may receive the downlink signals from the BS 102 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

In regards to an example uplink transmission, UE 104 further includes a transmit processor 264 that may receive and process data (e.g., for the PUSCH) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 102.

At BS 102, the uplink signals from UE 104 may be received by antennas 234*a*-*t*, processed by the demodulators in transceivers 232*a*-232*t*, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 212, scheduler 244, memory 242, transmit processor 220, controller/processor 240, TX MIMO processor 230, transceivers 232*a*-*t*, antenna 234*a*-*t*, and/or other aspects described herein. Similarly, "receiving" may refer to various mechanisms of obtaining data, such as obtaining data from antennas 234*a*-*t*, transceivers 232*a*-*t*, RX MIMO detector 236, controller/processor 240, receive processor 238, scheduler 244, memory 242, and other aspects described herein.

In various aspects, UE 104 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254*a*-*t*, antenna 252*a*-*t*, and/or other aspects described herein. Similarly, "receiving" may refer to various mechanisms of obtaining data, such as obtaining data from antennas 252*a*-*t*, transceivers 254*a*-*t*, RX MIMO detector 256, controller/processor 280, receive processor 258, memory 282, and other aspects described herein.

In some aspects, a processor may be configured to perform various operations, such as those associated with the methods described herein, and transmit (output) to or receive (obtain) data from another interface that is configured to transmit or receive, respectively, the data.

As above, FIGS. 3A, 3B, 3C, and 3D depict various example aspects of data structures that may be used in wireless communication network 100 of FIG. 1.

Wireless communication systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 3B and 3D) into multiple orthogonal subcarriers. Each subcarrier may be modulated with data. Modulation symbols may be sent in the frequency domain with OFDM and in the time domain with SC-FDM.

A wireless communication frame structure may be frequency division duplex (FDD), in which for a particular set of subcarriers and subframes within the set of subcarriers are dedicated for either DL or UL. Wireless communication frame structures may also be time division duplex (TDD), in which for a particular set of subcarriers and subframes within the set of subcarriers are dedicated for both DL and UL.

In FIGS. 3A and 3C, the wireless communication frame structure is TDD where D is DL, U is UL, and X is flexible for use between DL/UL. UEs may be configured with the slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot configuration. Subframes may also include minislots, which generally have fewer symbols than an entire slot. Other wireless communication technologies may have a different frame structure and/or different channels.

Generally, the number of slots within a subframe is based on a slot configuration and a numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 3A, 3B, 3C, and 3D, a resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DMRS) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may also transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a first network entity, comprising:
    communicating a message with a second network entity, the message including a request related to transmission of one or more measurement reference signals for measuring interference between the first network entity and the second network entity; and
    based on the communicated message, measuring the interference between the first network entity and the second network entity based on the one or more measurement reference signals,
    wherein:
        communicating the message with the second network entity comprises receiving the message from the second network entity, wherein the request in the message requests the first network entity to decrease a measuring periodicity associated with the one or more measurement reference signals from a first measuring periodicity to a second measuring periodicity that is shorter than the first measuring periodicity, and wherein measuring the interference comprises receiving the one or more measurement reference signals from the second network entity according to the second measuring periodicity and measuring the interference between the first network entity and the second network entity based on the one or more measurement reference signals received from the second network entity; or
        communicating the message with the second network entity comprises transmitting the message to the second network entity, wherein the request in the message requests the second network entity to decrease a transmission periodicity associated with transmitting the one or more measurement reference signals from a first transmission periodicity to a second transmission periodicity that is shorter than the first transmission periodicity, and wherein measuring the interference comprises receiving the one or more measurement reference signals from the second network entity according to the decreased transmission periodicity and measuring the interference between the first network entity and the second network entity based on the one or more measurement reference signals received from the second network entity.

2. The method of claim 1, wherein:
communicating the message with the second network entity comprises receiving the message from the second network entity, wherein the request in the message requests the first network entity to decrease the measuring periodicity associated with the one or more measurement reference signals from the first measuring periodicity to the second measuring periodicity that is shorter than the first measuring periodicity, and
measuring the interference comprises:
    receiving the one or more measurement reference signals from the second network entity according to the second measuring periodicity, and
    measuring the interference between the first network entity and the second network entity based on the one or more measurement reference signals received from the second network entity.

3. The method of claim 1, wherein:
communicating the message with the second network entity comprises transmitting the message to the second network entity, wherein the request in the message requests the second network entity to decrease the transmission periodicity associated with transmitting the one or more measurement reference signals from the first transmission periodicity to the second transmission periodicity that is shorter than the first transmission periodicity, and
measuring the interference comprises:
    receiving the one or more measurement reference signals from the second network entity according to the decreased transmission periodicity, and
    measuring the interference between the first network entity and the second network entity based on the one or more measurement reference signals received from the second network entity.

4. A method for wireless communication by a second network entity, comprising:
    communicating a message with a first network entity, the message including a request related to transmission of one or more measurement reference signals for measuring interference between the first network entity and the second network entity; and
    transmitting the one or more measurement reference signals based on the communicated message, wherein:
   communicating the message with the first network entity comprises transmitting the message to the first network entity, wherein the request in the message requests the first network entity to decrease a measuring periodicity associated with the one or more measurement reference signals from a first measuring periodicity to a second measuring periodicity that is shorter than the first measuring periodicity, and transmitting the one or more measurement reference signals comprises transmitting the one or more measurement reference signals based on the second measuring periodicity; or
   communicating the message with the first network entity comprises receiving the message from the first network entity, wherein the request in the message requests the second network entity to decrease a transmission periodicity associated with transmitting the one or more measurement reference signals from a first transmission periodicity to a second transmission periodicity that is shorter than the first transmission periodicity, and transmitting the one or more measurement reference signals comprises transmitting the one or more measurement reference signals to the first network entity according to the second transmission periodicity.

5. The method of claim 4, wherein:
communicating the message with the first network entity comprises transmitting the message to the first network entity, wherein the request in the message requests the first network entity to decrease the measuring periodicity associated with the one or more measurement reference signals from the first measuring periodicity to the second measuring periodicity that is shorter than the first measuring periodicity, and
transmitting the one or more measurement reference signals comprises transmitting the one or more measurement reference signals based on the second measuring periodicity.

6. The method of claim 4, wherein:
communicating the message with the first network entity comprises receiving the message from the first network entity, wherein the request in the message requests the second network entity to decrease the transmission periodicity associated with transmitting the one or more measurement reference signals from the first transmission periodicity to the second transmission periodicity that is shorter than the first transmission periodicity, and
transmitting the one or more measurement reference signals comprises transmitting the one or more measurement reference signals to the first network entity according to the second transmission periodicity.

7. A first network entity, comprising:
a memory comprising executable instructions; and
one or more processors configured to execute the executable instructions and cause the first network entity to:
   communicate a message with a second network entity, the message including a request related to transmission of one or more measurement reference signals for measuring interference between the first network entity and the second network entity; and
   based on the communicated message, measure the interference between the first network entity and the second network entity based on one or more measurement reference signals, wherein:
   to communicate the message with the second network entity, the one or more processors are configured to execute the executable instructions and cause the first network entity to receive the message from the second network entity, wherein the request in the message requests the first network entity to decrease a measuring periodicity associated with the one or more measurement reference signals from a first measuring periodicity to a second measuring periodicity that is shorter than the first measuring periodicity, and wherein to measure the interference, the one or more processors are configured to execute the executable instructions and cause the first network entity to receive the one or more measurement reference signals from the second network entity according to the second measuring periodicity and to measure the interference between the first network entity and the second network entity based on the one or more measurement reference signals received from the second network entity; or
   to communicate the message with the second network entity, the one or more processors are configured to execute the executable instructions and cause the first network entity to transmit the message to the second network entity, wherein the request in the message requests the second network entity to decrease a transmission periodicity associated with transmitting the one or more measurement reference signals from a first transmission periodicity to a second transmission periodicity that is shorter than the first transmission periodicity, and wherein to measure the interference, the one or more processors are configured to execute the executable instructions and cause the first network entity to receive the one or more measurement reference signals from the second network entity according to the decreased transmission periodicity and to measure the interference between the first network entity and the second network entity based on the one or more measurement reference signals received from the second network entity.

8. The first network entity of claim 7, wherein:
to communicate the message with the second network entity, the one or more processors are configured to execute the executable instructions and cause the first network entity to receive the message from the second network entity, wherein the request in the message requests the first network entity to decrease the measuring periodicity associated with the one or more measurement reference signals from the first measuring periodicity to the second measuring periodicity that is shorter than the first measuring periodicity, and
to measure the interference, the one or more processors are configured to execute the executable instructions and cause the first network entity to:
   receive the one or more measurement reference signals from the second network entity according to the second measuring periodicity, and
   measure the interference between the first network entity and the second network entity based on the one or more measurement reference signals received from the second network entity.

9. The first network entity of claim 8, wherein:
the first network entity comprises one of:
   a non-mobile or low mobility base station (BS), or
   a non-mobile or low mobility integrated access and backhaul (IAB) node, and
the second network entity comprises one of high mobility BS or a high mobility IAB node.

10. The first network entity of claim 8, wherein:
to receive the message from the second network entity, the one or more processors are configured to execute the executable instructions and cause the first network entity to receive an explicit message via a backhaul link between the first network entity and the second network entity,
the first network entity comprises a first distributed unit (DU) of a base station (BS),
the second network entity comprises a second DU of the BS,
to receive the explicit message, the one or more processors are configured to execute the executable instructions and cause the first network entity to receive the explicit message via the backhaul link at the first DU from second DU via a centralized unit (CU) of the BS.

11. The first network entity of claim 8, wherein:
to receive the message from the second network entity, the one or more processors are configured to execute the executable instructions and cause the first network entity to receive an explicit message via a backhaul link between the first network entity and the second network entity,
the first network entity comprises a first distributed unit (DU) of a first base station (BS),
the second network entity comprises a second DU of a second BS,
to receive the explicit message, the one or more processors are configured to execute the executable instructions and cause the first network entity to receive the explicit message via the backhaul link at the first DU from the second DU via a first centralized unit (CU) of the first BS and a second CU of the second BS.

12. The first network entity of claim 8, wherein:
to receive the message from the second network entity, the one or more processors are configured to execute the executable instructions and cause the first network entity to receive an explicit message via over-the-air (OTA) signaling, and
the OTA signaling comprises at least one of:
   a predefined reference sequence,
   physical uplink control channel (PUCCH) signaling, or
   physical sidelink shared channel (PSSCH) signaling.

13. The first network entity of claim 8, wherein:
the message comprises an implicit message that comprises at least one of a cell identifier (ID) associated with the second network entity or a random access channel (RACH) message associated with the second network entity.

14. The first network entity of claim 7, wherein:
to communicate the message with the second network entity, the one or more processors are configured to execute the executable instructions and cause the first network entity to transmit the message to the second network entity, wherein the request in the message requests the second network entity to decrease the transmission periodicity associated with transmitting the one or more measurement reference signals from the first transmission periodicity to the second transmission periodicity that is shorter than the first transmission periodicity, and
to measure the interference, the one or more processors are configured to execute the executable instructions and cause the first network entity to:
   receive the one or more measurement reference signals from the second network entity according to the decreased transmission periodicity, and
   measure the interference between the first network entity and the second network entity based on the one or more measurement reference signals received from the second network entity.

15. The first network entity of claim 14, wherein:
the first network entity comprises one of a high mobility BS or a high mobility integrated access and backhaul (IAB) node, and
the second network entity comprises one of:
   a non-mobile or low mobility BS, or
   a non-mobile or low mobility IAB node.

16. The first network entity of claim 14, wherein:
to transmit the message to the second network entity, the one or more processors are configured to execute the executable instructions and cause the first network entity to transmit an explicit message via a backhaul link between the first network entity and the second network entity,
the first network entity comprises a first distributed unit (DU) of a base station (BS),
the second network entity comprises a second DU of the BS,
to transmit the explicit message, the one or more processors are configured to execute the executable instructions and cause the first network entity to transmit the explicit message via the backhaul link from the first DU to the second DU via a centralized unit (CU) of the BS.

17. The first network entity of claim 14, wherein:
to transmit the message to the second network entity, the one or more processors are configured to execute the executable instructions and cause the first network entity to transmit an explicit message via a backhaul link between the first network entity and the second network entity,
the first network entity comprises a first distributed unit (DU) of a first base station (BS),
the second network entity comprises a second DU of a second BS,
to transmit the explicit message, the one or more processors are configured to execute the executable instructions and cause the first network entity to transmit the explicit message via the backhaul link from the first DU to the second DU via a first centralized unit (CU) of the first BS and a second CU of the second BS.

18. The first network entity of claim 14, wherein:
to transmit the message to the second network entity, the one or more processors are configured to execute the executable instructions and cause the first network entity to transmit an explicit message via over-the-air (OTA) signaling, and
the OTA signaling comprises at least one of:
   a predefined reference sequence,
   physical downlink control channel (PDCCH) signaling, or
   physical sidelink shared channel (PSSCH) signaling.

19. The first network entity of claim 14, wherein:
the message comprises an implicit message that comprises at least one of cell identifier (ID) associated with the first network entity or a random access channel (RACH) message associated with the first network entity.

20. A second network entity, comprising:
a memory comprising executable instructions; and
one or more processors configured to execute the executable instructions and cause the second network entity to:
communicate a message with a first network entity, the message including a request related to transmission of one or more measurement reference signals for measuring interference between the first network entity and the second network entity; and
transmit the one or more measurement reference signals based on the communicated message,
wherein:
to communicate the message with the first network entity, the one or more processors are configured to execute the executable instructions and cause the second network entity to transmit the message to the first network entity, wherein the request in the message requests the first network entity to decrease a measuring periodicity associated with the one or more measurement reference signals from a first measuring periodicity to a second measuring periodicity that is shorter than the first measuring periodicity, and wherein to transmit the one or more measurement reference signals, the one or more processors are configured to execute the executable instructions and cause the second network entity to transmit the one or more measurement reference signals based on the second measuring periodicity; or
to communicate the message with the first network entity, the one or more processors are configured to execute the executable instructions and cause the second network entity to receive the message from the first network entity, wherein the request in the message requests the second network entity to decrease a transmission periodicity associated with transmitting the one or more measurement reference signals from a first transmission periodicity to a second transmission periodicity that is shorter than the first transmission periodicity, and wherein to transmit the one or more measurement reference signals, the one or more processors are configured to execute the executable instructions and cause the second network entity to transmit the one or more measurement reference signals to the first network entity according to the second transmission periodicity.

21. The second network entity of claim 20, wherein:
to communicate the message with the first network entity, the one or more processors are configured to execute the executable instructions and cause the second network entity to transmit the message to the first network entity, wherein the request in the message requests the first network entity to decrease the measuring periodicity associated with the one or more measurement reference signals from the first measuring periodicity to the second measuring periodicity that is shorter than the first measuring periodicity, and
to transmit the one or more measurement reference signals, the one or more processors are configured to execute the executable instructions and cause the second network entity to transmit the one or more measurement reference signals based on the second measuring periodicity.

22. The second network entity of claim 21, wherein:
the first network entity comprises one of:
a non-mobile or low mobility base station (BS), or
a non-mobile or low mobility integrated access and backhaul (IAB) node, and the second network entity comprises one of high mobility BS or a high mobility IAB node.

23. The second network entity of claim 21, wherein:
to transmit the message to the first network entity, the one or more processors are configured to execute the executable instructions and cause the second network entity to transmit an explicit message via a backhaul link between the first network entity and the second network entity,
the first network entity comprises a first distributed unit (DU) of a base station (BS),
the second network entity comprises a second DU of the BS,
to transmit the explicit message, the one or more processors are configured to execute the executable instructions and cause the second network entity to transmit the explicit message via the backhaul link from the second DU to the first DU via a centralized unit (CU) of the BS.

24. The second network entity of claim 21, wherein:
to transmit the message to the first network entity, the one or more processors are configured to execute the executable instructions and cause the second network entity to transmit an explicit message via a backhaul link between the first network entity and the second network entity,
the first network entity comprises a first distributed unit (DU) of a first base station (BS),
the second network entity comprises a second DU of a second BS,
to transmit the explicit message, the one or more processors are configured to execute the executable instructions and cause the second network entity to transmit the explicit message via the backhaul link from the second DU to the first DU via a first centralized unit (CU) of the first BS and a second CU of the second BS.

25. The second network entity of claim 21, wherein:
to transmit the message to the first network entity, the one or more processors are configured to execute the executable instructions and cause the second network entity to transmit an explicit message via over-the-air (OTA) signaling, and
the OTA signaling comprises at least one of:
a predefined reference sequence,
physical downlink control channel (PDCCH) signaling, or
physical sidelink shared channel (PSSCH) signaling.

26. The second network entity of claim 21, wherein:
the message comprises an implicit message that comprises at least one of a cell identifier (ID) associated with the second network entity or a random access channel (RACH) message associated with the second network entity.

27. The second network entity of claim 20, wherein:
to communicate the message with the first network entity, the one or more processors are configured to execute the executable instructions and cause the second network entity to receive the message from the first network entity, wherein the request in the message requests the second network entity to decrease the transmission periodicity associated with transmitting the one or more measurement reference signals from the first transmission periodicity to the second transmission periodicity that is shorter than the first transmission periodicity, and to transmit the one or more measurement reference signals, the one or more processors are configured to execute the executable instructions and cause the second network entity to transmit the one or more measurement reference signals to the first network entity according to the second transmission periodicity.

28. The second network entity of claim 27, wherein:

the first network entity comprises one of a high mobility BS or a high mobility integrated access and backhaul (IAB) node, and the second network entity comprises one of:
a non-mobile or low mobility BS, or
a non-mobile or low mobility IAB node.

29. The second network entity of claim 27, wherein:

to receive the message from the first network entity, the one or more processors are configured to execute the executable instructions and cause the second network entity to receive an explicit message via a backhaul link between the first network entity and the second network entity, the first network entity comprises a first distributed unit (DU) of a base station (BS), the second network entity comprises a second DU of the BS, to receive the explicit message, the one or more processors are configured to execute the executable instructions and cause the second network entity to receive the explicit message via the backhaul link at the second DU from the first DU via a centralized unit (CU) of the BS.

30. The second network entity of claim 27, wherein:

to receive the message from the first network entity, the one or more processors are configured to execute the executable instructions and cause the second network entity to receive an explicit message via a backhaul link between the first network entity and the second network entity, the first network entity comprises a first distributed unit (DU) of a first base station (BS), the second network entity comprises a second DU of a second BS, to receive the explicit message, the one or more processors are configured to execute the executable instructions and cause the second network entity to receive the explicit message via the backhaul link at the second DU from the first DU via a first centralized unit (CU) of the first BS and a second CU of the second BS.

31. The second network entity of claim 27, wherein:

to receive the message from the first network entity, the one or more processors are configured to execute the executable instructions and cause the second network entity to receive an explicit message via over-the-air (OTA) signaling, and the OTA signaling comprises at least one of:
a predefined reference sequence,
physical uplink control channel (PUCCH) signaling, or
physical sidelink shared channel (PSSCH) signaling.

32. The second network entity of claim 27, wherein:

the message comprises an implicit message that comprises at least one of a cell identifier (ID) associated with the first network entity or a random access channel (RACH) message associated with the first network entity.

* * * * *